United States Patent
Oteru et al.

(10) Patent No.: US 11,882,061 B2
(45) Date of Patent: *Jan. 23, 2024

(54) DATA SEQUENCE CORRECTION METHOD, PACKET MONITORING DEVICE, DATA SEQUENCE CORRECTION DEVICE, AND DATA SEQUENCE CORRECTION PROGRAM

(71) Applicant: Nippon Telegraph and Telephone Corporation, Tokyo (JP)

(72) Inventors: Shoko Oteru, Tokyo (JP); Shuhei Yoshida, Tokyo (JP); Yuta Ukon, Tokyo (JP); Namiko Ikeda, Tokyo (JP); Koyo Nitta, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 20 days.

This patent is subject to a terminal disclaimer.

(21) Appl. No.: 17/619,189

(22) PCT Filed: Jun. 24, 2019

(86) PCT No.: PCT/JP2019/024898
§ 371 (c)(1),
(2) Date: Dec. 14, 2021

(87) PCT Pub. No.: WO2020/261320
PCT Pub. Date: Dec. 30, 2020

(65) Prior Publication Data
US 2022/0247697 A1 Aug. 4, 2022

(51) Int. Cl.
*H04L 49/9057* (2022.01)
*H04L 1/1607* (2023.01)
(Continued)

(52) U.S. Cl.
CPC ........ *H04L 49/9057* (2013.01); *H04L 1/1621* (2013.01); *H04L 47/28* (2013.01); *H04L 47/34* (2013.01); *H04L 49/557* (2013.01)

(58) Field of Classification Search
None
See application file for complete search history.

(56) References Cited

U.S. PATENT DOCUMENTS

2009/0290592 A1 11/2009 Konishi et al.
2023/0009530 A1* 1/2023 Oteru .................... H04L 49/901

FOREIGN PATENT DOCUMENTS

JP   2006013612 A   1/2006
JP   2009171157 A * 7/2009 ............ H04L 49/90
(Continued)

*Primary Examiner* — Kouroush Mohebbi
(74) *Attorney, Agent, or Firm* — Slater Matsil, LLP

(57) ABSTRACT

A data sequence correction method for temporarily saving data with sequence information in a ring buffer and performing sequence correction is provided. The ring buffer includes a number of storage regions, a monitoring section having one or more continuous sequence numbers, and an acceptance section having a first or second sequence number of the monitoring section as a start sequence number and a sequence number immediately preceding the start sequence number of the monitoring section as an end sequence number. The method includes, when a value determined based on a remainder obtained by dividing a sequence number of received data by the number of storage regions is inside the acceptance section, writing the received data in a position of the storage region corresponding to the determined value, and when data are written in the entire monitoring section, reading out all the data in the monitoring section.

13 Claims, 20 Drawing Sheets

(51) Int. Cl.
*H04L 47/28* (2022.01)
*H04L 47/34* (2022.01)
*H04L 49/55* (2022.01)

(56) References Cited

FOREIGN PATENT DOCUMENTS

| | | | |
|---|---|---|---|
| JP | 2009171157 | A | 7/2009 |
| JP | 5479793 | B2 | 4/2014 |
| JP | 5625992 | B2 | 11/2014 |
| JP | 2016139978 | A * | 8/2016 |
| JP | 2016139978 | A | 8/2016 |

* cited by examiner

DATA SEQUENCE CORRECTION METHOD, PACKET MONITORING DEVICE, DATA SEQUENCE CORRECTION DEVICE, AND DATA SEQUENCE CORRECTION PROGRAM

This patent application is a national phase filing under section 371 of PCT/JP2019/024898, filed on Jun. 24, 2019, which application is hereby incorporated herein by reference.

TECHNICAL FIELD

The present invention relates to a data sequence correction method for rearranging received data with sequence numbers in the order of the sequence numbers.

BACKGROUND

In a communication scheme for encoding and packetizing sound and video at a fixed cycle and transmitting the sound and the video, packets arriving at random are temporarily saved in a buffer for sequence correction on an acceptance side. The packets are rearranged in correct sequence based on sequence information (usually, sequence numbers) stored in headers of the packets and then the original sound and video are reproduced.

When fluctuation (jitter) of a delay applied in a transmission path is too large, the reproduction of the sound and the video is temporarily stopped in order to wait for arrival of a packet having a large delay, or a packet having an extremely large delay is discarded and a dropout occurs in the sound and the video. Communication companies desire to, for the purpose of specifying a jitter occurrence part, divide and extract a network signal with a network tap or the like inserted into a communication path and measure jitters of packets.

In a delay measurement method described in Patent Literature 1, a terminal that transmits packets adds transmission time information to transmission packets and transmits the transmission packets. A packet monitoring device records acceptance times of packets extracted by a network tap or the like, reads out transmission time information from the arrived packets, calculates delays of the packets from differences between the acceptance times and transmission times, and observes fluctuation in the delays.

On the other hand, in Patent Literature 2, jitters of packets are observed without using transmission time information. In Patent Literature 2, targeting packets provided with periodically generated sequence numbers, results obtained by arranging received packets in order (sequence correction) and calculating arrival intervals of the packets are totaled to observe fluctuation in packet intervals.

In a sequence correction method described in Patent Literature 3, as shown in FIG. 21, a ring buffer is divided into a plurality of storage regions, two or more continuous storage regions are set as a monitoring section, sent data is stored in a predetermined storage region, it is monitored whether data necessary for reassembling is stored in the monitoring section, when the data necessary for the reassembling are collected in the monitoring section, the data are invoked, and, when the storage region where the data is stored is behind the monitoring section, the monitoring section is moved to set the tail end of the monitoring section as the storage region where the data is stored.

CITATION LIST

Patent Literature

Patent Literature 1: Japanese Patent No. 5479793
Patent Literature 2: Japanese Patent No. 5625992
Patent Literature 3: Japanese Patent Laid-Open No. 2009-171157

SUMMARY

Technical Problem

In Patent Literature 1, it is necessary to adjust a standard of time information, for example, a unit of time between the terminal that transmits packets and the packet monitoring device. On the other hand, in Patent Literature 2, since it is assumed to couple a received plurality of data and reassemble original large data, the ring buffer of a sufficiently large size having storage regions for all sequence numbers is used and, when data necessary for the reassembling are collected in the monitoring section, the data are read out from the ring buffer.

When the number of storage regions of the ring buffer is limited and the storage regions for all the sequence numbers cannot be implemented, for example, it is conceivable to determine, based on a remainder obtained by dividing a sequence number by the number of storage regions of the ring buffer, a storage region where data is written, when data near the start are collected, read out the data from the ring buffer, and repeatedly use a free storage region for data having the same remainder. However, when data, a remainder of which is the same as a remainder of data already saved in the ring buffer and a sequence number of which is different from a sequence number of the data already saved in the ring buffer, arrives, there is a problem in which the data are arranged in the wrong order.

Embodiments of the present invention have been devised in order to solve such a problem, and an object of some embodiments of the present invention is to provide a data sequence correction method capable of accurately rearranging received data in sequence number order even when the number of storage regions of a ring buffer is limited.

Means for Solving the Problem

In order to solve the problem described above, a data sequence correction method of embodiments of the present invention is a data sequence correction method for temporarily saving data with sequence information in a ring buffer and performing sequence correction. The ring buffer includes a predetermined number of storage regions corresponding to the sequence information and includes a monitoring section having one or two or more continuous sequence numbers and an acceptance section having a first or second sequence number of the monitoring section as a start sequence number and having a sequence number immediately preceding the start sequence number of the monitoring section as an end sequence number. The data sequence correction method includes: a step of, when a value determined based on a remainder obtained by dividing a sequence number of received data by the number of storage regions of the ring buffer is inside the acceptance section, writing the received data in a position of the storage region corresponding to the determined value; a step of, when data are written in the entire monitoring section, reading out all the data in the monitoring section; and a step of updating, within a range of a number of sequence numbers of the monitoring section, a start sequence number and an end sequence number of each of the monitoring section and the acceptance section to following sequence numbers.

In order to solve the problem described above, a packet monitoring device of embodiments of the present invention includes: an arrival-time-information provision unit that provides arrival time information to a received packet having a header in which sequence information is included; a monitoring-target extraction unit that extracts a monitoring target packet based on information in the header of the packet; a packet-sequence correction unit that corrects, based on the sequence information in a header of the monitoring target packet, a sequence of the monitoring target packet with the data sequence correction method and outputs arrival time information of two packets, the sequence information of which is continuous; a packet-interval calculation unit that calculates a packet interval from a difference between arrival times of the two packets, the sequence information of which is continuous; and a visualization unit that displays, as a histogram, a frequency distribution of a packet interval stored in a statistical-information storage unit.

In order to solve the problem described above, a data sequence correction device of embodiments of the present invention is a data sequence correction device that temporarily saves data with sequence information in a ring buffer and performs sequence correction. The ring buffer includes a predetermined number of storage regions corresponding to the sequence information and includes a monitoring section having one or two or more continuous sequence numbers and an acceptance section having a first or second sequence number of the monitoring section as a start sequence number and having a sequence number immediately preceding the start sequence number of the monitoring section as an end sequence number. The data sequence correction device includes: an acceptability determination unit that determines whether a value determined based on a remainder obtained by dividing a sequence number of received data by the number of storage regions of the ring buffer is inside the acceptance section; a ring-buffer write unit that, when the value determined based on the remainder obtained by dividing the sequence number of the received data by the number of storage regions of the ring buffer is inside the acceptance section, writes the received data in a position of the storage region corresponding to the determined value; a ring-buffer readout unit that, when data are written in the entire monitoring section, reads out all the data in the monitoring section; and a monitoring section/acceptance section management unit that updates, within a range of a number of sequence numbers of the monitoring section, a start sequence number and an end sequence number of each of the monitoring section and the acceptance section to following sequence numbers.

In order to solve the problem described above, a data sequence correction program of embodiments of the present invention is a data sequence correction program for executing a data sequence correction method for temporarily saving data with sequence information in a ring buffer and performing sequence correction. The ring buffer includes a predetermined number of storage regions corresponding to the sequence information and includes a monitoring section having one or two or more continuous sequence numbers and an acceptance section having a first or second sequence number of the monitoring section as a start sequence number and having a sequence number immediately preceding the start sequence number of the monitoring section as an end sequence number. The data sequence correction program causes a computer to execute: a step of, when a value determined based on a remainder obtained by dividing a sequence number of received data by the number of storage regions of the ring buffer is inside the acceptance section, writing the received data in a position of the storage region corresponding to the determined value; a step of, when data are written in the entire monitoring section, reading out all the data in the monitoring section; and a step of updating, within a range of a number of sequence numbers of the monitoring section, a start sequence number and an end sequence number of each of the monitoring section and the acceptance section to following sequence numbers.

Effects of Embodiments of the Invention

As explained above, according to embodiments of the present invention, it is possible to provide a data sequence correction method capable of accurately rearranging received data in sequence number order even when the number of storage regions of a ring buffer is limited.

DETAILED DESCRIPTION OF ILLUSTRATIVE EMBODIMENTS

Embodiments of the present invention are explained in detail below with reference to the drawings. The present invention is not limited to the embodiments explained below.

First Embodiment

In an embodiment of the present invention, a case in which, in a call of an IP telephone, a packet stored in an RTP (Real-Time Transport Protocol) packet and transmitted with sound data encoded at equal intervals by a sound codec scheme such as G.711 is set as a target of sequence correction is explained as an example. Note that a target of application of embodiments of the present invention is not limited to the configuration of the packet explained below.

Figure 1:
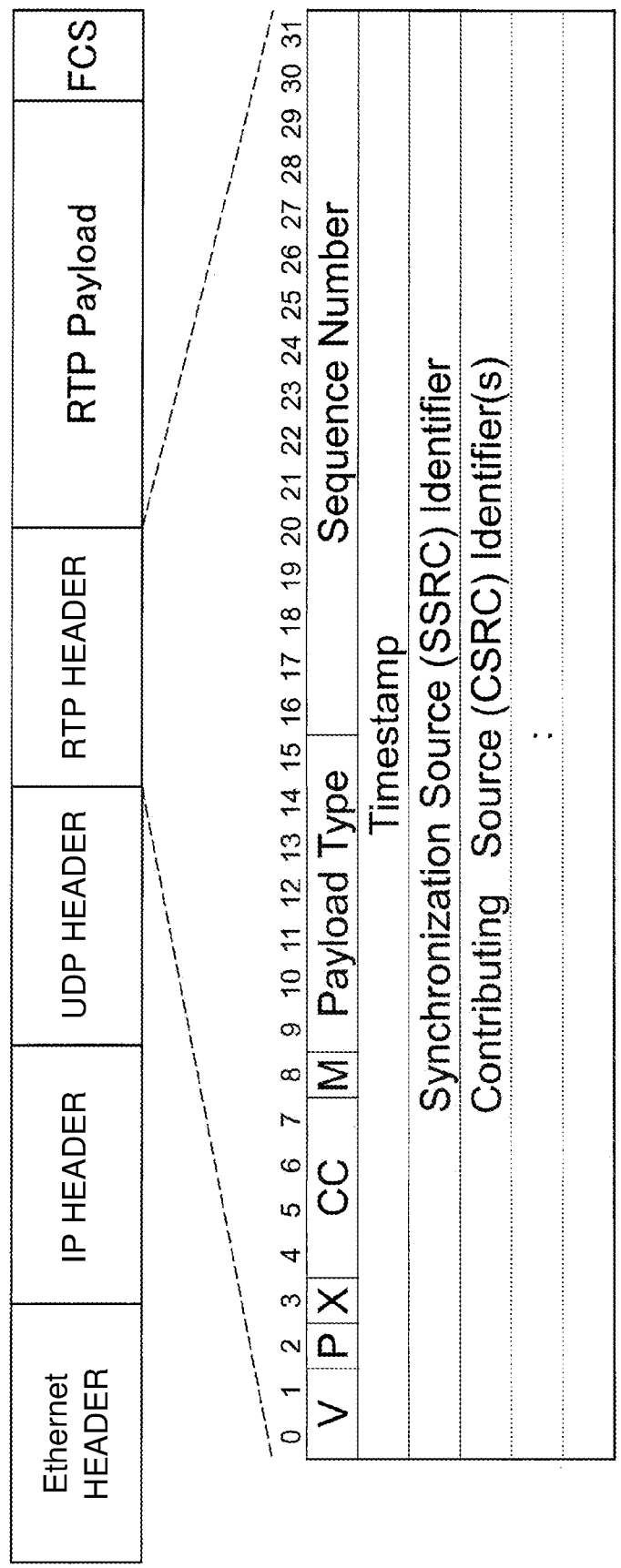
FIG. 1 is a configuration example of a packet format according to an embodiment.

FIG. 1 is a configuration example of a format of an RTP packet, which is a target of sequence correction in a first embodiment. In an RTP header of the RTP packet, a sequence number (16-bit width, a range is 0 to 65535) indicating sequence of generation of a packet is stored. Sequence numbers of a plurality of RTP packets delivered in the same call are configured to start from a random value at a call start time and increase by one at a time until a call end, and return to 0 next to 65535. Accordingly, the RTP packets immediately after generation are temporally at equal intervals and the sequence numbers are serial numbers.

Figure 2:
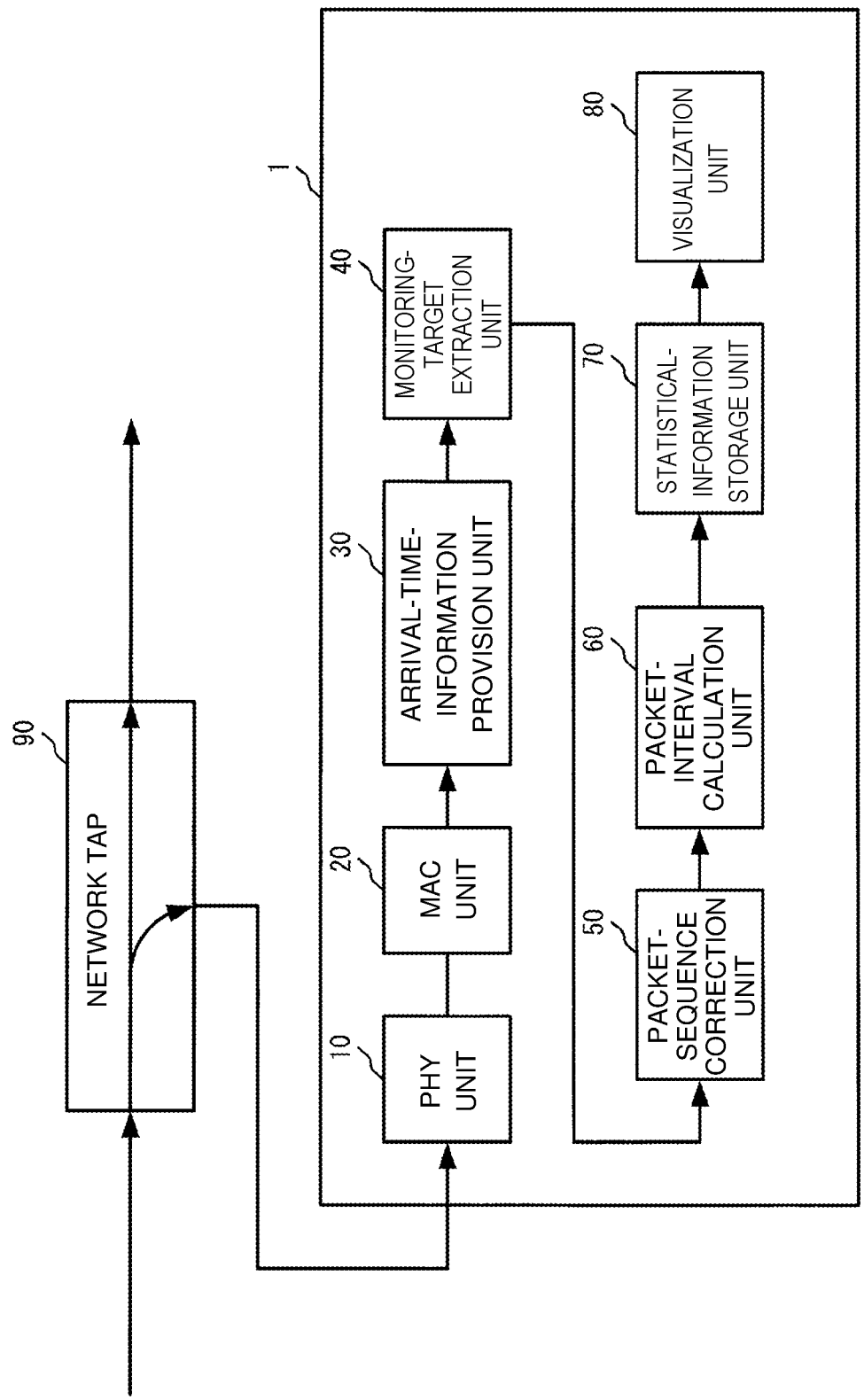
FIG. 2 is a diagram showing a configuration example of a packet monitoring device according to an embodiment.

On the other hand, the RTP packets after transmission do not arrive temporally at equal intervals because a delay in a transmission path is not fixed for each packet. Further, the packets sometimes do not arrive as indicated by the order of the sequence numbers. Jitters among the packets can be monitored by dividing and extracting a network signal with a network tap 90 or the like set in a communication path, calculating arrival intervals of the serial number RTP packets with a packet monitoring device, and displaying the arrival intervals in a histogram, the horizontal axis of which indicates a packet arrival interval. FIG. 2 is a configuration example of a packet monitoring device according to this embodiment.

Packet Monitoring Device

A packet monitoring device 1 in this embodiment includes a PHY unit 10, a MAC unit 20, an arrival-time-information provision unit 30, a monitoring-target extraction unit 40, a packet-sequence correction unit 50, a packet-interval calculation unit 60, a statistical-information storage unit 70, and a visualization unit 80. The PHY unit 10 performs processing in a physical layer (PHY) on a received packet. The MAC unit 20 performs processing in a data link layer (MAC) on the received packet. The arrival-time-information provision unit 30 provides arrival time information to the received packet. The monitoring-target extraction unit 40 extracts, based on information in a header of the packet, a monitoring target packet of the same flow having a header in which sequence information is included. The packet-sequence correction unit 50 corrects the sequence of the monitoring target packet based on sequence information (a sequence number in FIG. 1) in the header of the monitoring target packet and outputs arrival time information of two packets, sequence information of which is continuous. The packet-interval calculation unit 60 calculates a packet interval from a difference between arrival times of the two packets, the sequence information of which is continuous. The statistical-information storage unit 70 stores the packet arrival interval. The visualization unit 80 displays, as a histogram, a frequency distribution of each packet arrival interval stored in the statistical-information storage unit 70.

Arrival-Time-Information Provision Unit

The arrival-time-information provision unit 30 provides arrival time information to the packet extracted by performing the processing in the physical layer (PHY) and the data link layer (MAC) on the received packet. As an example of means for providing time information, there is, for example, a method of inserting or overwriting the time information into or on the header or a method of transferring the time information to a post-stage block in parallel to the packet.

Monitoring-Target Extraction Unit

The monitoring-target extraction unit 40 extracts, based on information in headers of packets, a packet to be set as a monitoring target. For example, the monitoring-target extraction unit 40 inspects transmission source addresses and destination addresses of the headers of the packets and a destination port number in a UDP header, extracts, as the monitoring target packet, a packet coinciding with a value registered as a monitoring target, and transmits the packet to the packet-sequence correction unit.

Packet-Sequence Correction Unit

The packet-sequence correction unit 50 corrects the sequence of the monitoring target packet based on a sequence number extracted from a header of the monitoring target packet and outputs arrival time information of two or more packets, sequence numbers of which are continuous, to the packet-interval calculation unit 6o. The configuration of the packet-sequence correction unit 50 and a packet sequence correction method are explained in detail in explanation about the configuration and an operation example of the packet-sequence correction unit 50 below.

Packet-Interval Calculation Unit

When the arrival time information of the two or more packets, the sequence numbers of which are continuous, is input from the packet-sequence correction unit 50, the packet-interval calculation unit 60 calculates a time interval of the packets from a difference between arrival times of two continuous packets. If the arrival time of the packet having a preceding sequence number is subtracted from the arrival time of the packet having a following sequence number, it can be determined not only the time interval of the packets but also whether sequence of the packets is inverted.

Statistical-Information Storage Unit

The statistical-information storage unit 70 stores a frequency distribution of the packet interval calculated by the packet-interval calculation unit 60. The statistical-information storage unit 70 may be configured to store, when, because of any one of reasons in a case in which the number of data stored from a start of a monitoring section to an end of an acceptance section of a ring buffer explained below reaches a fixed number, a case in which received data is discarded outside the acceptance section, and a case in which a fixed time elapses from arrival time of data at the start of the monitoring section or closest to the start, the monitoring section and the acceptance section are moved, a frequency of the movement for each of the reasons or collectively.

Visualization Unit

The visualization unit 80 displays, as a histogram, the frequency distribution of the packet interval stored in the statistical-information storage unit 70.

Configuration of a Ring Buffer

Figure 3:
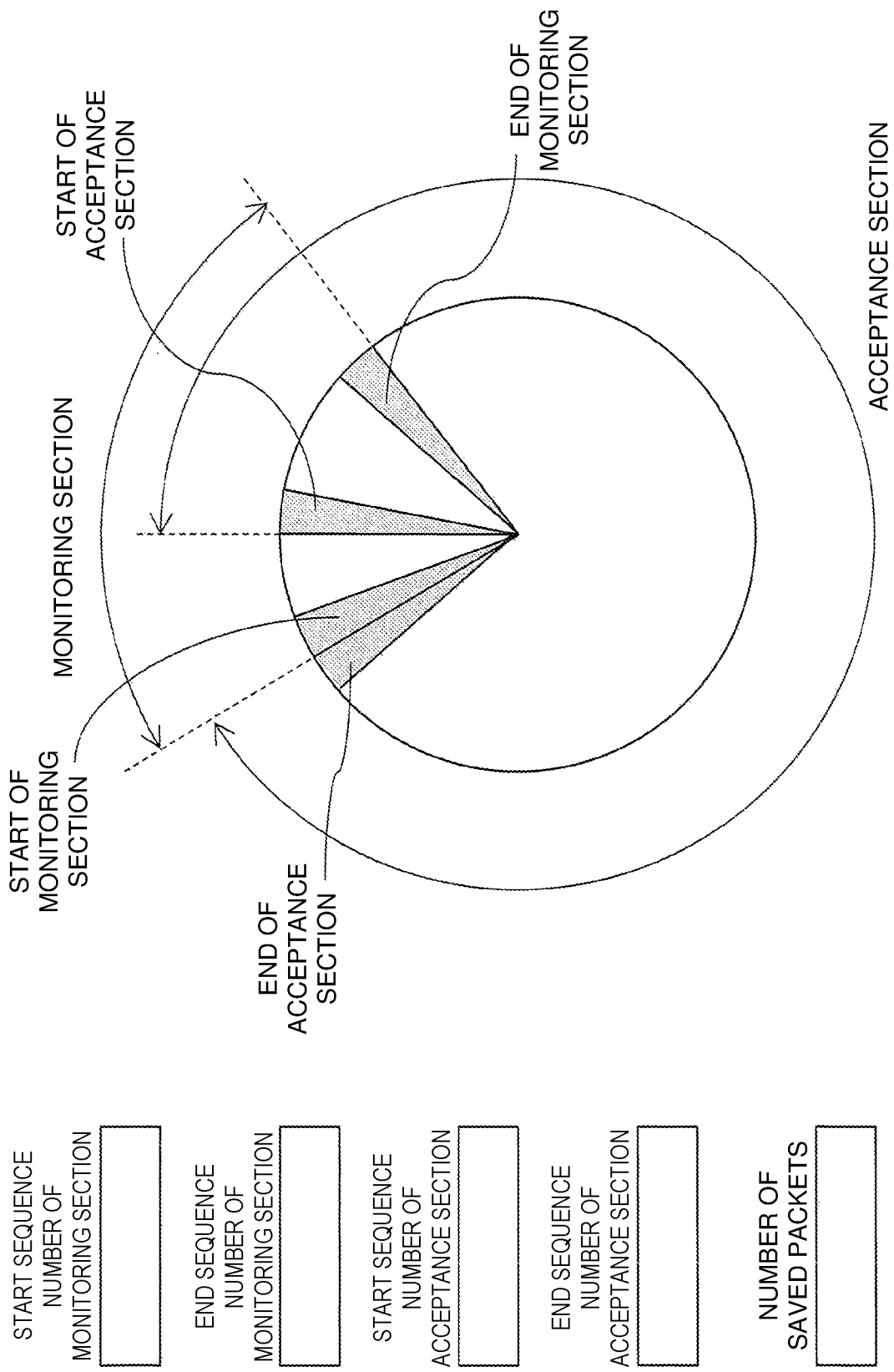
FIG. 3 is a diagram showing a configuration example of a ring buffer according to an embodiment.
Figure 21:
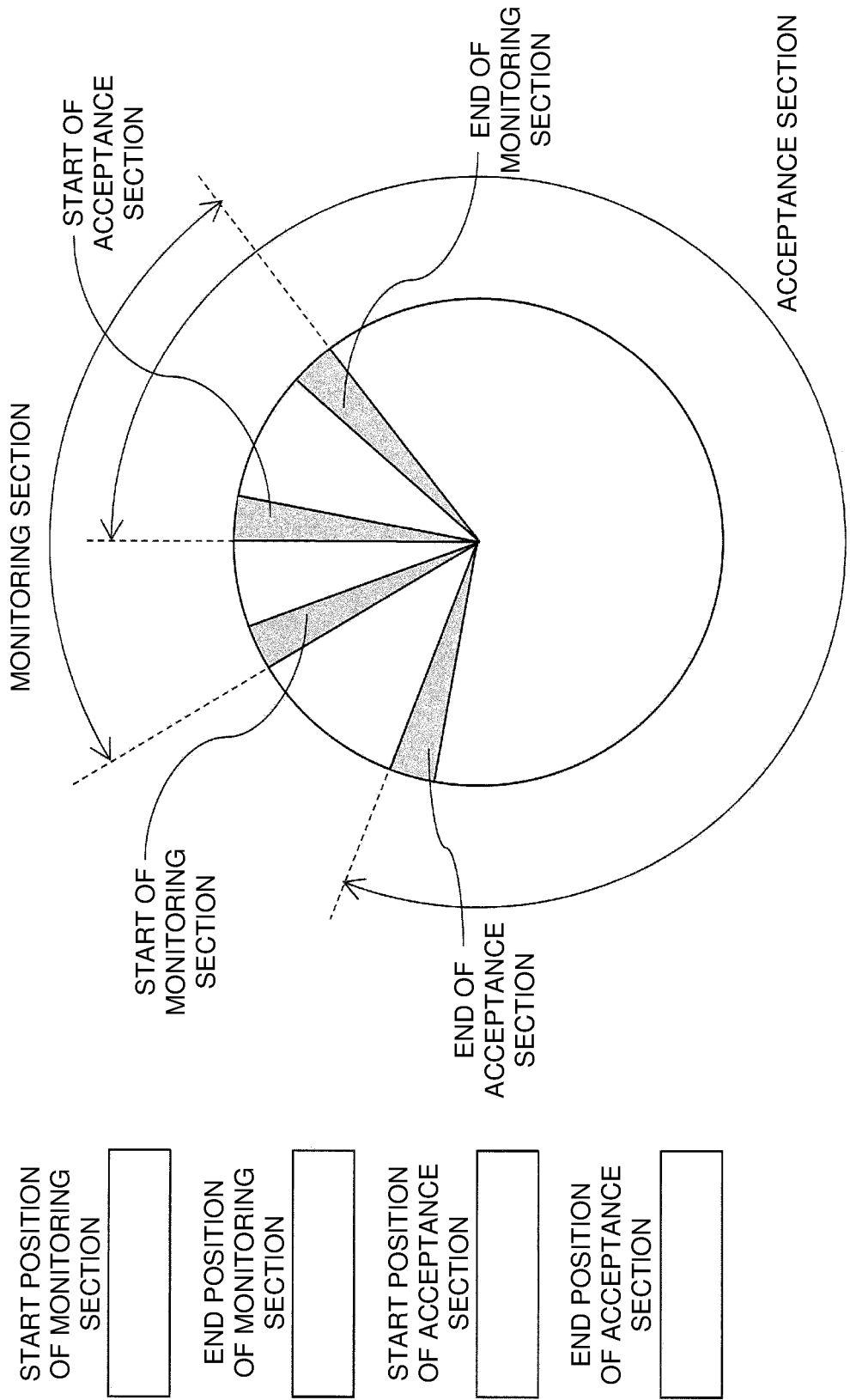
FIG. 21 is a configuration example of a ring buffer in the related art.

FIG. 3 is a configuration example of a ring buffer according to this embodiment. The ring buffer in this configuration example includes a predetermined number of storage regions corresponding to sequence information and has one or two or more continuous sequence numbers as a monitoring section. The ring buffer in this configuration example includes an acceptance section having a first or second sequence number of the monitoring section as a start sequence number and having a sequence number immediately preceding the start sequence number of the monitoring section as an end sequence number. A position corresponding to a sequence number to which the ring buffer makes one turn from the start sequence number of the monitoring section is an end of the acceptance section. Unlike the ring buffer in the related art shown in FIG. 21, in an embodiment of the present invention, the starts and the ends of the monitoring section and the acceptance section are represented by the sequence numbers and managed. Note that, when widths and intervals of the monitoring section and the acceptance section are fixed, from any one kind of four kinds of sequence numbers described in FIG. 3, the other three kinds of sequence numbers can be learned. Therefore, at least any one kind of a sequence number only has to be managed.

In the ring buffer according to this embodiment, it is determined whether a sequence number of received data is a sequence number inside the acceptance section. When the sequence number of the received data is inside the acceptance section, the received data is written in a storage region corresponding to the sequence number of the received data. On the other hand, when the sequence number of the received data is outside the acceptance section, the received data is discarded.

The operation explained above is repeatedly performed. When all the data is written inside the monitoring section, all the data in the monitoring section is read out. At the same time, the start sequence number and the end sequence number of each of the monitoring section and the acceptance section are increased within a range of the number of sequence numbers of the monitoring section. The monitoring section and the acceptance section are moved. For example, when the number of sequence numbers of the monitoring section is two, the monitoring section and the acceptance section are moved for one storage region to following sections or the monitoring section and the acceptance section are moved for two storage regions to following sections.

Configuration of the Packet-Sequence Correction Unit

Figure 4:
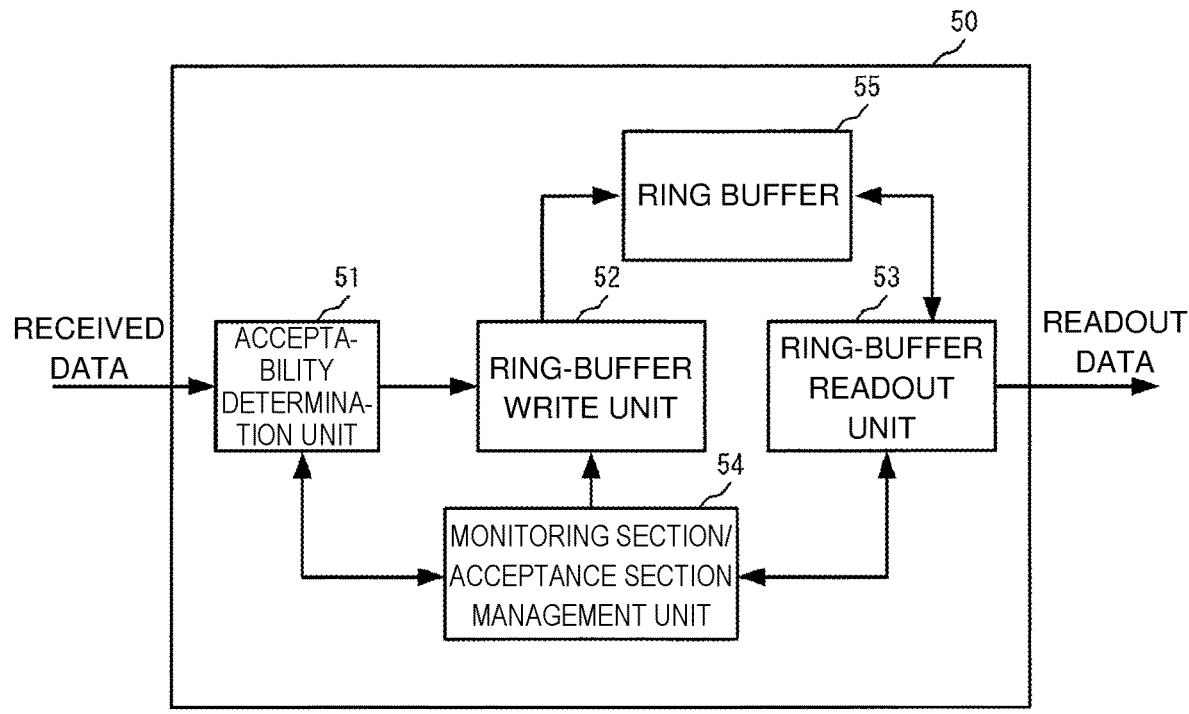
FIG. 4 is a diagram showing a configuration example of a data sequence correction device according to an embodiment.

FIG. 4 is a configuration example of the packet-sequence correction unit 50 according to this embodiment. The packet-sequence correction unit 50 is a functional unit that temporarily saves data with sequence information in the ring buffer and performs sequence correction.

As shown in FIG. 4, the packet-sequence correction unit 50 is configured from an acceptability determination unit 51, a ring-buffer write unit 52, a ring-buffer readout unit 53, and a monitoring section/acceptance section management unit 54. The acceptability determination unit 51 determines whether sequence information of received data is inside the acceptance section. When the sequence information of the received data is inside the acceptance section, the ring-buffer write unit 52 writes the received data in the position of a storage region corresponding to the sequence information of the received data in a ring buffer 55. When data are written in the entire monitoring section, the ring-buffer readout unit 53 reads out all the data in the monitoring section from the ring buffer 55. The monitoring section/acceptance section management unit 54 manages the monitoring section and the acceptance section and moves the monitoring section and the acceptance section according to necessity.

As an example of the packet monitoring device 1 in this embodiment, the PHY unit 10, the MAC unit 20, the arrival-time-information provision unit 30, the monitoring-target extraction unit 40, the packet-sequence correction unit 50, the packet-interval calculation unit 60, and the statistical-information storage unit 70 can be realized as hardware on a NIC (Network Interface Card). The visualization unit 80 can be realized by a computer, visualization software installed in the computer, and a display connected to the computer.

Figure 5:
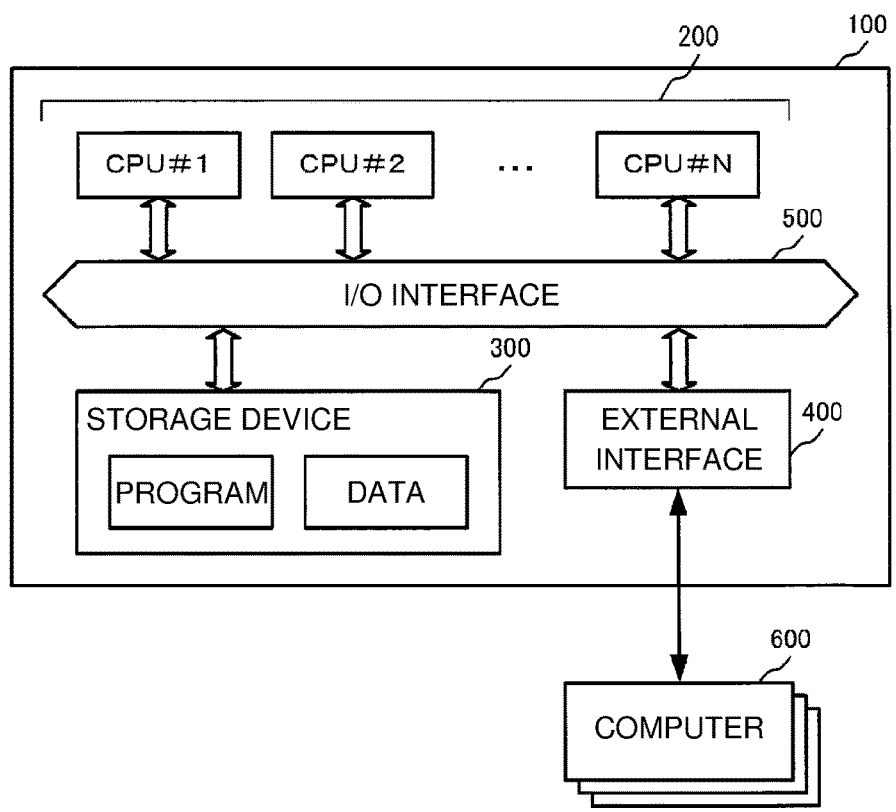
FIG. 5 is a configuration example of a computer for realizing the data sequence correction device and the like according to an embodiment.

As another example of the packet monitoring device 1 in this embodiment, the arrival-time-information provision unit 30, the monitoring-target extraction unit 40, the packet-sequence correction unit 50, the packet-interval calculation unit 60, the statistical-information storage unit 70, and the visualization unit 80 can be realized by a computer including a CPU (Central Processing Unit), a storage device, and an external interface (hereinafter external I/F) and a program for controlling these hardware resources. A configuration example of such a computer is shown in FIG. 5.

A computer 100 includes a CPU 200, a storage device 300, and an external I/F 400, which are connected to one another via an I/O interface 500. Programs such as a data sequence correction program for realizing the operation of the packet monitoring device 1 in this embodiment, received data, arrival time information of the received data, and data of the monitoring section, the acceptance section, and the like are stored in the storage device 300. Other computers 600 that transmit and receive signals to and from one another are connected to the external I/F 400. The CPU 200 executes processing explained in this embodiment according to the data sequence correction program and the like stored in the storage device 300. This processing program may be recorded in a computer-readable recording medium.

Operation Example of the Packet-Sequence Correction Unit

Figure 6:
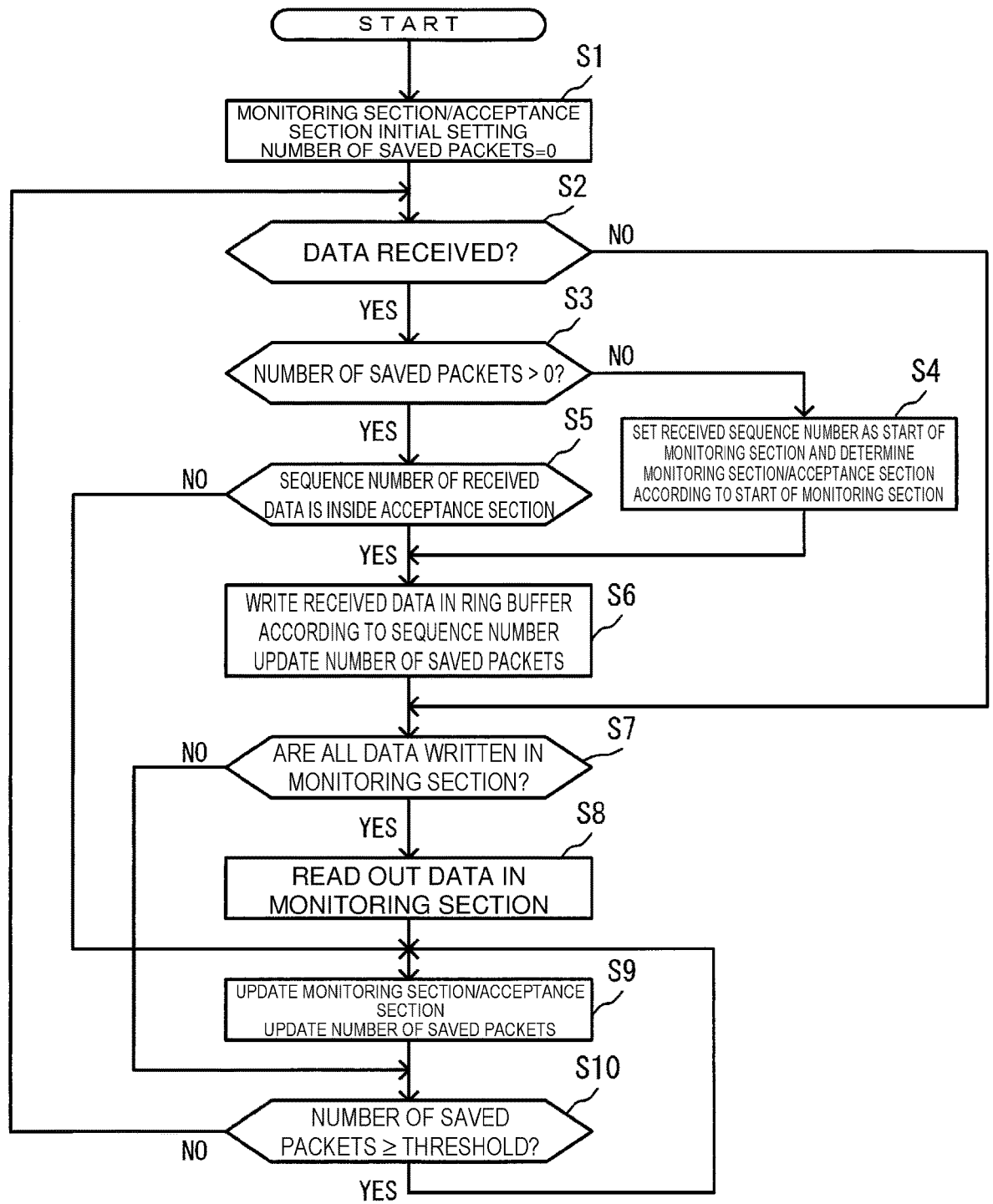
FIG. 6 is a diagram showing an example of an operation flowchart of a data sequence correction method according to an embodiment.

FIG. 6 is an example of an operation flowchart of a data sequence correction method according to this embodiment. In the data sequence correction method according to this embodiment, a monitoring section and an acceptance section are initially set and the number of saved packets is set to 0 (S1). The data sequence correction method includes a step (S6) of, when receiving data (S2), when the number of saved packets is larger than 0 (S3) and a value determined based on a remainder obtained by dividing a sequence number of the received data by the number of storage regions of the ring buffer is inside the acceptance section (S5), writing the received data in the position of a storage region corresponding to the determined value and updating the number of saved packets (S6), a step (S8) for reading out, when data are written in the entire monitoring section (S7), all the data in the monitoring section, and a step (S9) for updating a start sequence number and an end sequence number of each of the monitoring section and the acceptance section and updating the saved packets. When the number of saved packets is smaller than a threshold, the packet-sequence correction unit transitions to S2, receives data, and repeats the operation explained above. The update of the sequence number means that the sequence number is moved to an immediately following sequence number.

When the number of saved packets reaches the threshold (Yes at S10), the packet-sequence correction unit transitions to S9, updates the start sequence number and the end sequence number of each of the monitoring section and the acceptance section, and updates the saved packets. When not receiving data in S2, the packet-sequence correction unit transitions to S7 and repeats S2→S7→S8→S9→S10→S2 until serial number data is interrupted or new data is received. When the number of saved packets is 0 in S3, the packet-sequence correction unit sets a received sequence number as a start of the monitoring section, determines an end of the monitoring section and a start and an end of the acceptance section according to the start of the monitoring section (S4), and transitions to S6. When the determined value is outside the acceptance section in S5, the packet-sequence correction unit transitions to S9. When data is not written in the entire monitoring section in S7, the packet-sequence correction unit transitions to S10.

Note that, in the first embodiment, a case in which the number of sequence numbers of the monitoring section is two, the start sequence number and the end sequence number of each of the monitoring section and the acceptance section are updated to immediately following sequence numbers, and the monitoring section and the acceptance section are moved for one sequence number to following sections is explained.

Operation from an Initial State

Figure 7:
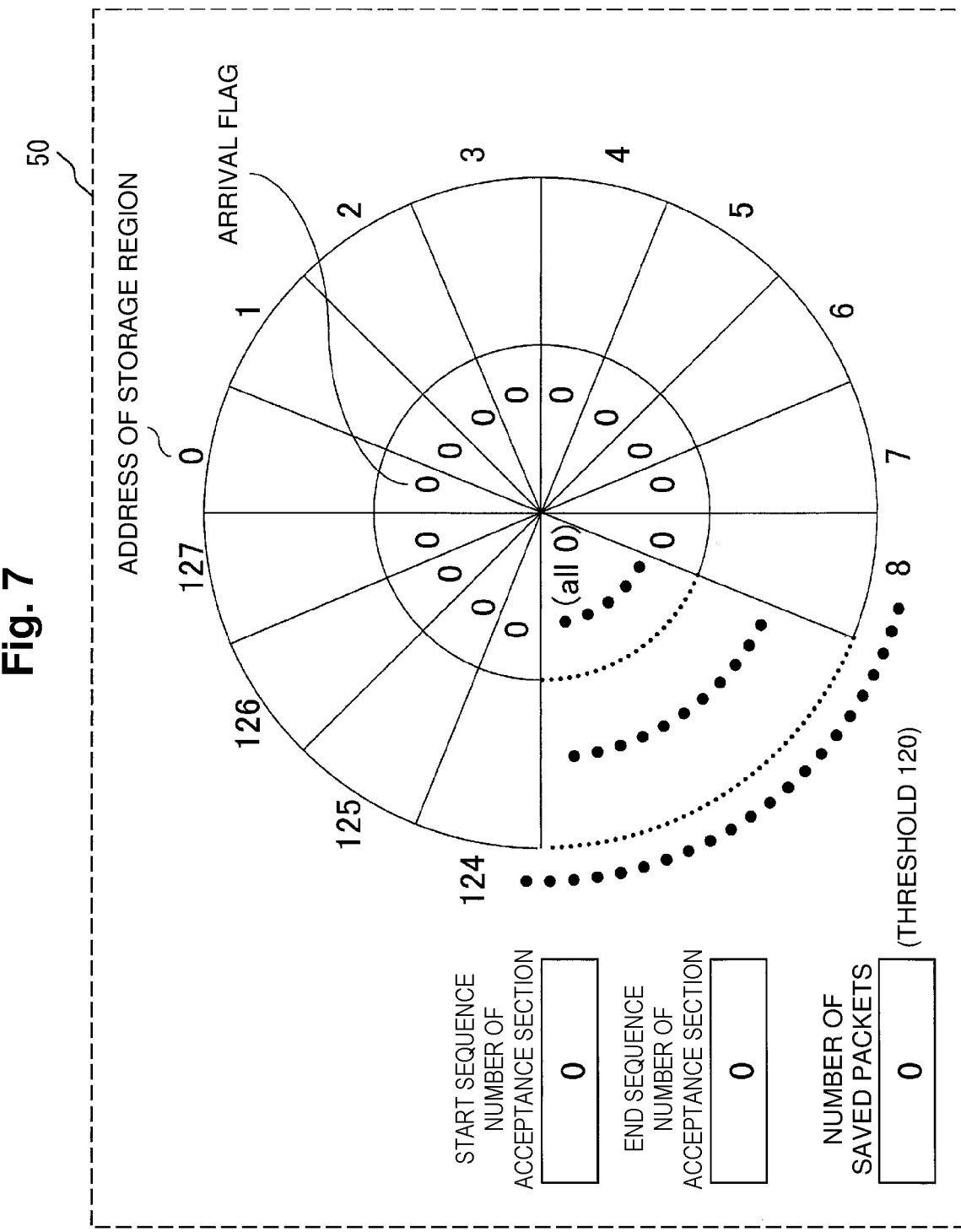
FIG. 7 is a diagram for explaining an initial state of the ring buffer according to an embodiment.

FIG. 7 is a diagram showing an initial state of the ring buffer in this embodiment. The number of storage regions of the ring buffer shown in FIG. 7 is one hundred and twenty-eight. The ring buffer is configured to be able to store arrival time information and an arrival flag of a received packet for one hundred and twenty-eight packets. In FIG. 7, a storage region where a start packet is stored is a start of the monitoring section. Two sequence numbers continuous from the start of the monitoring section are the monitoring section. A second sequence number of the monitoring section is set as a start of the acceptance section and a 126 (128-width of the monitoring section)-th sequence number following a start sequence number of the monitoring section is set as an end of the acceptance section. In this case, a storage region corresponding to a sequence number immediately preceding the start sequence number of the monitoring section is the end of the acceptance section.

A packet to be a target of sequence correction is the RTP packet explained with reference to FIG. 1. Sequence numbers 0 to 65535 in the RTP header are equivalent to sequence numbers. Whereas there are 65535 sequence numbers, storage regions of the ring buffer are only for one hundred and twenty-eight packets. Therefore, addresses of storage regions at storage destinations of arrival time information and arrival flags of the packets are determined by mod (sequence number, 128). As an example, a threshold of the number of saved packets of the ring buffer is set to one hundred and twenty packets. A storage region where a packet received in the initial state is stored is a start of the monitoring section. A start sequence number and an end sequence number of each of the monitoring section and the acceptance section are determined according to the start of the monitoring section.

The packet-sequence correction unit 50 retains the start sequence numbers and the end sequence numbers of the monitoring section and the acceptance section and the number of saved packets in a register or the like. These kinds of information are updated at any time according to necessity when the arrival time information is written or read out.

Figure 8:
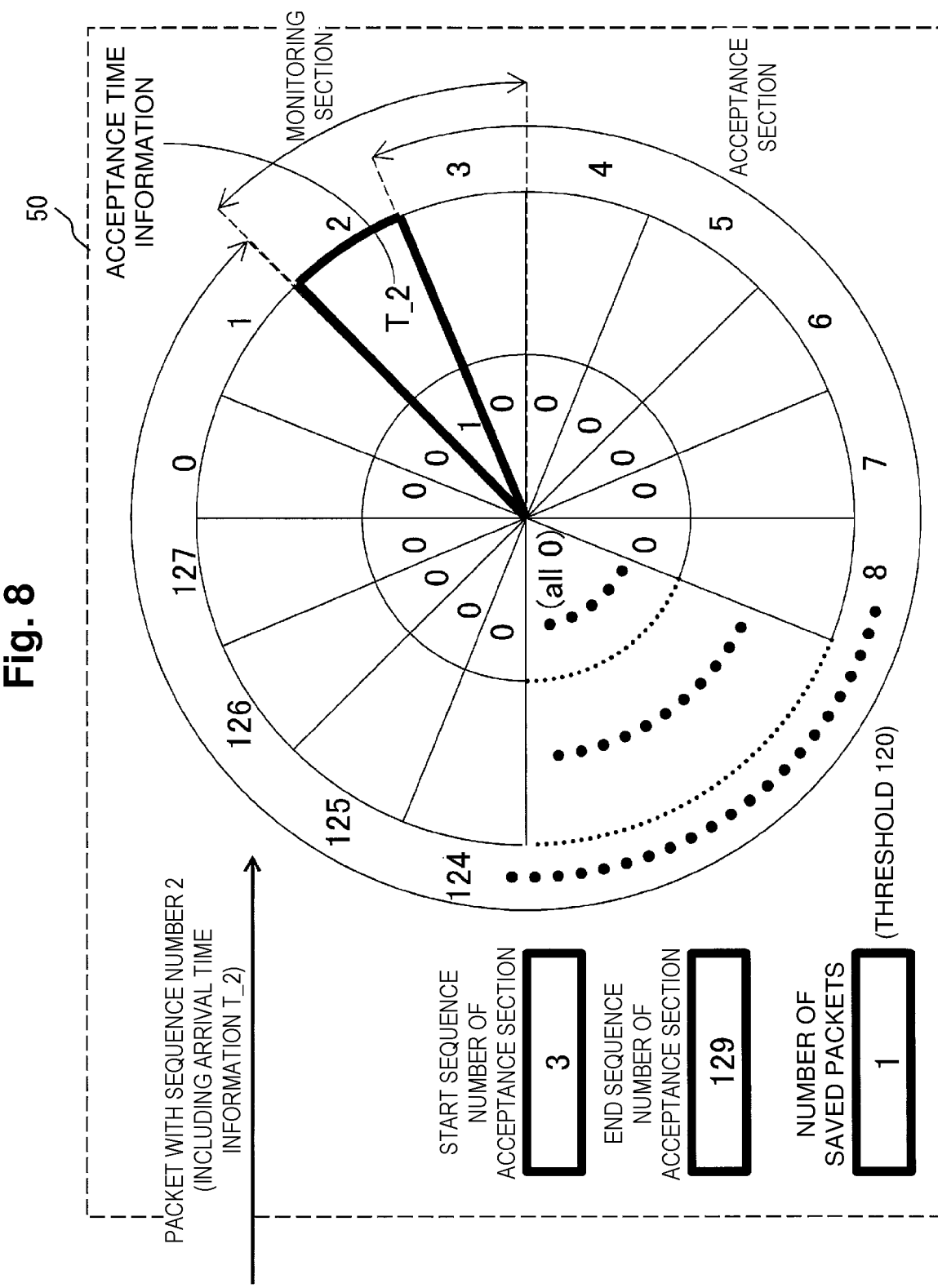
FIG. 8 is a diagram for explaining the operation of the ring buffer according to an embodiment.

FIG. 8 shows a state of the ring buffer after a packet with a sequence number=2 arrives and arrival time information T_2 of the packet is written in the initial state with the number of saved packets=0 shown in FIG. 7. T_2 is written in an address 2 (=mod(2, 128)) of a storage region corresponding to the sequence number 2. Consequently, the sequence number "2" becomes a start of the monitoring section. When T_2 is written in the address 2, an arrival flag of the address 2 of the storage region is 1. The start sequence number of the acceptance section is "3" immediately following the start sequence number "2" of the monitoring section. The end sequence number of the acceptance section is "129", which is a 126 (128-2)-th sequence number following the start sequence number 3. Since the number of storage regions, arrival flags of which are 1, is one, the number of saved packets is one.

Figure 9:
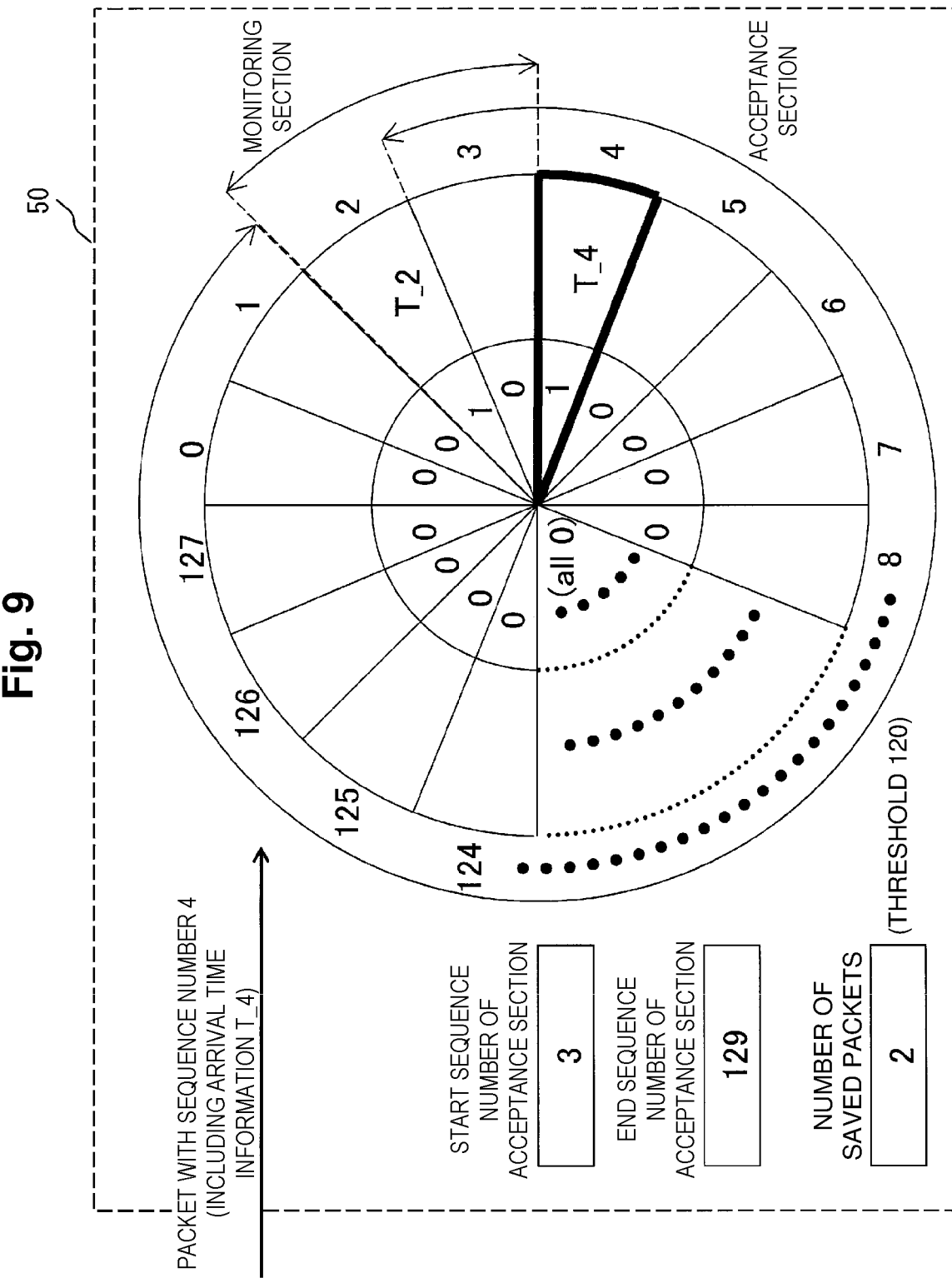
FIG. 9 is a diagram for explaining the operation of the ring buffer according to an embodiment.

FIG. 9 shows a state of the ring buffer after a packet with a sequence number=4 arrives and arrival time information T_4 of the packet is written in the state shown in FIG. 8. Since the sequence number 4 of the received packet is inside the acceptance section with respect to the start sequence number 3 to the end sequence number 129 of the acceptance section shown in FIG. 8, T_4 is stored in an address 4 (=mod(4, 128)) of a storage region corresponding to the sequence number 4, an arrival flag of the address 4 is set to 1, and the number of saved packets is increased by one to two. In the state shown in FIG. 9, since data is not written in the entire monitoring section, readout processing from the monitoring section is not executed and movement of the monitoring section and the acceptance section is not performed.

Figure 10:
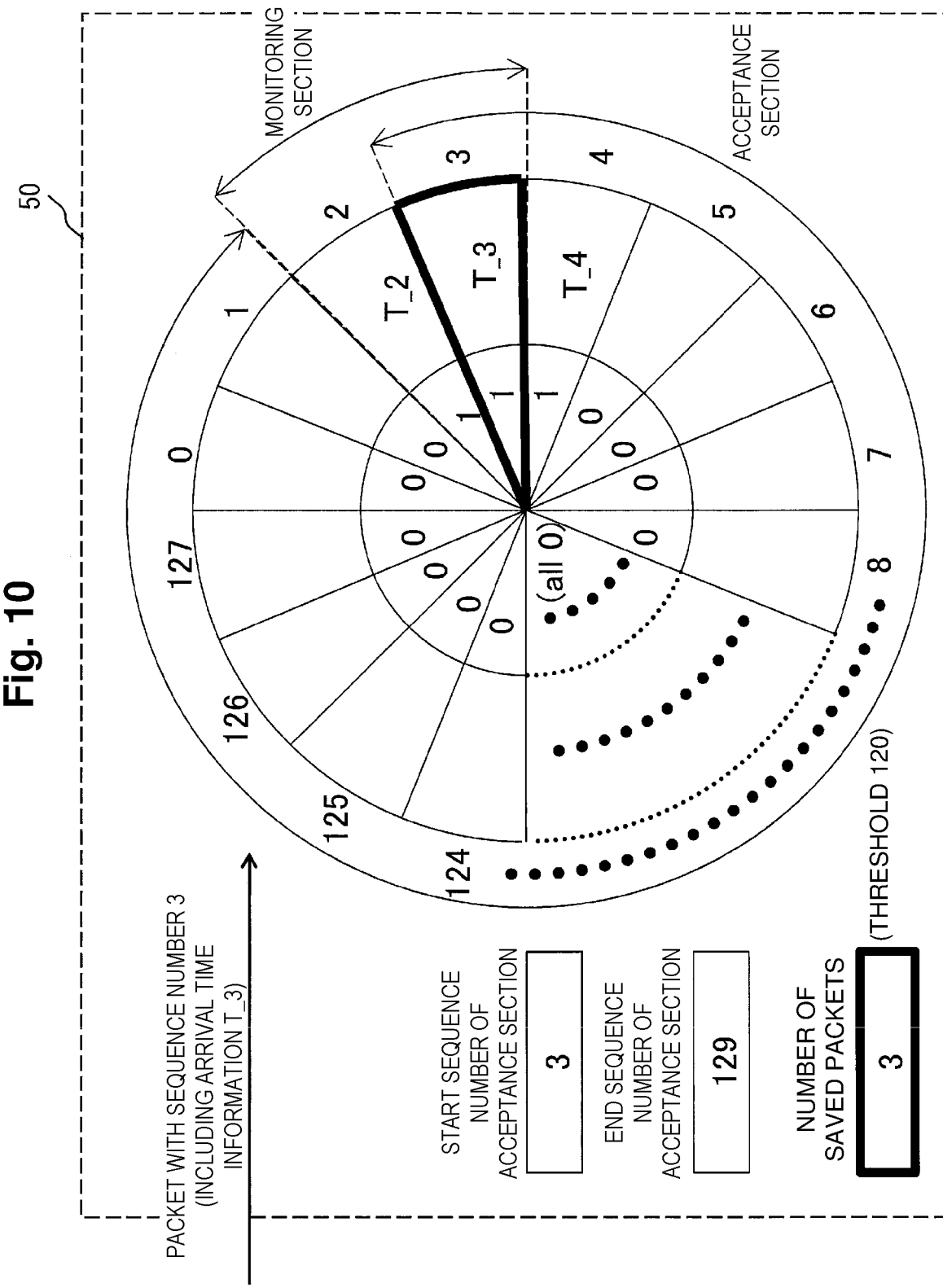
FIG. 10 is a diagram for explaining the operation of the ring buffer according to an embodiment.

FIG. 10 shows a state of the ring buffer after a packet with a sequence number=3 arrives and arrival time information T_3 of the packet is written in the state shown in FIG. 9. Since the sequence number 3 of the received packet is inside the acceptance section with respect to the start sequence number 3 to the end sequence number 129 of the acceptance section shown in FIG. 9, T_3 is stored in an address 3 (=mod(3, 128)) corresponding to the sequence number 3, an arrival flag of the address 3 is set to 1, and the number of saved packets is increased by one to three.

Figure 11:
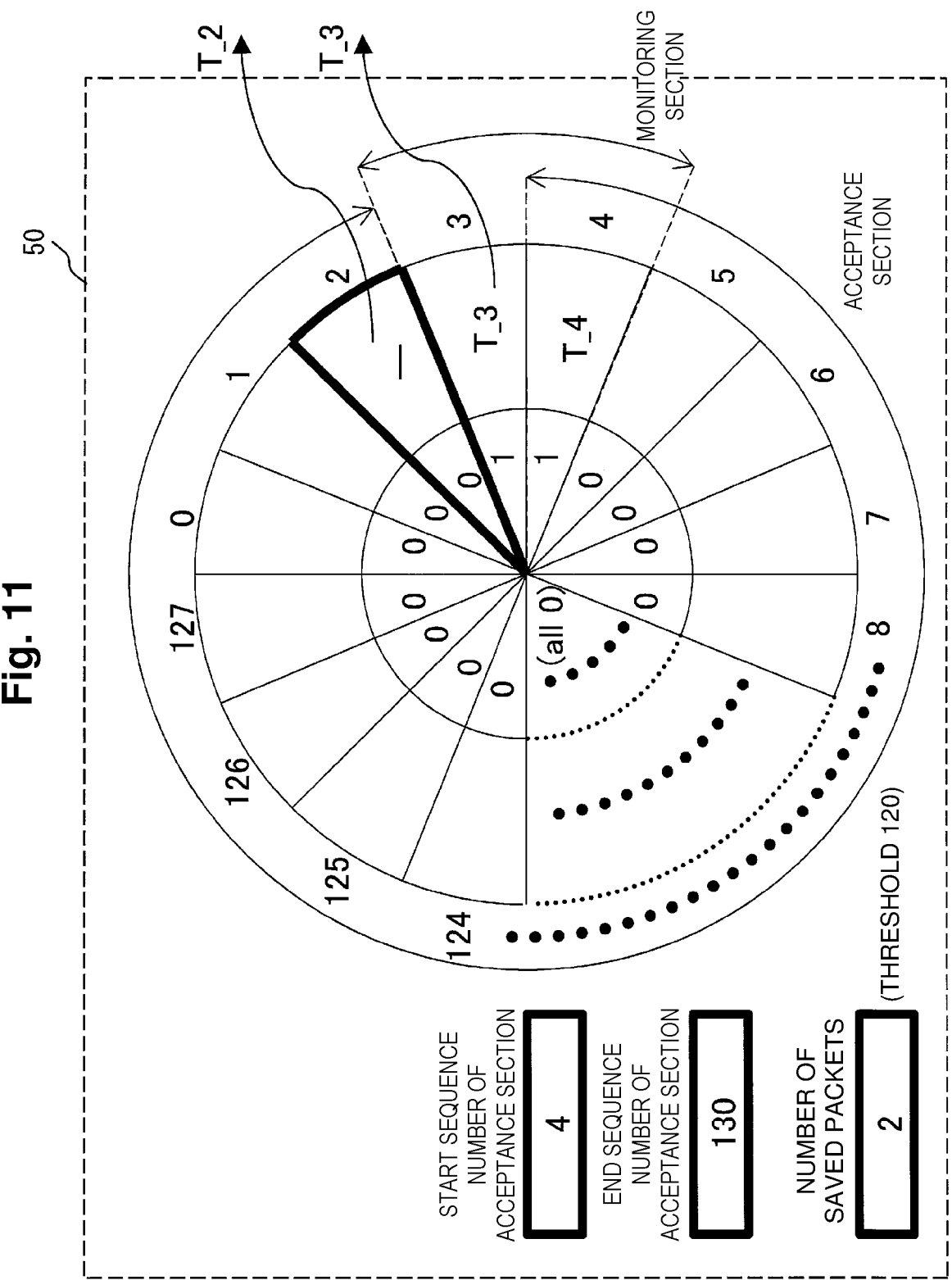
FIG. 11 is a diagram for explaining the operation of the ring buffer according to an embodiment.

In FIG. 11, all data (the arrival time information T_2 and T_3) are collected in the monitoring section in the state shown in FIG. 10. Therefore, processing for reading out all the data in the monitoring section from the ring buffer is executed. According to the execution of the readout processing from the monitoring section, the start sequence number and the end sequence number of each of the monitoring section and the acceptance section are updated to immediately following sequence numbers. The monitoring section and the acceptance section are respectively moved to immediately following sections. In this figure, in order to calculate an interval between the packet with the sequence number 3 and the packet with the next sequence number 4, the data T_3 of the sequence number 3 of the monitoring section is left even after the arrival time information T_2 and T_3 is read out.

In FIG. 11, the start sequence number and the end sequence number of the monitoring section are updated to (3, 4), which are numbers immediately following (2, 3) shown in FIG. 10, and the start sequence number and the end sequence number of the acceptance section are updated to (4, 130), which are numbers immediately following (3, 129) shown in FIG. 10, and the monitoring section and the acceptance section are moved. The arrival flag of the storage region (the address 2) deviating from the monitoring section is lowered and the number of saved packets decreases by one to two. The arrival time information T_2 and T_3 read out from the ring buffer is transferred to the packet-interval calculation unit. The packet-interval calculation unit calculates a packet interval (T_3-T_2) of the serial number packets.

Figure 12:
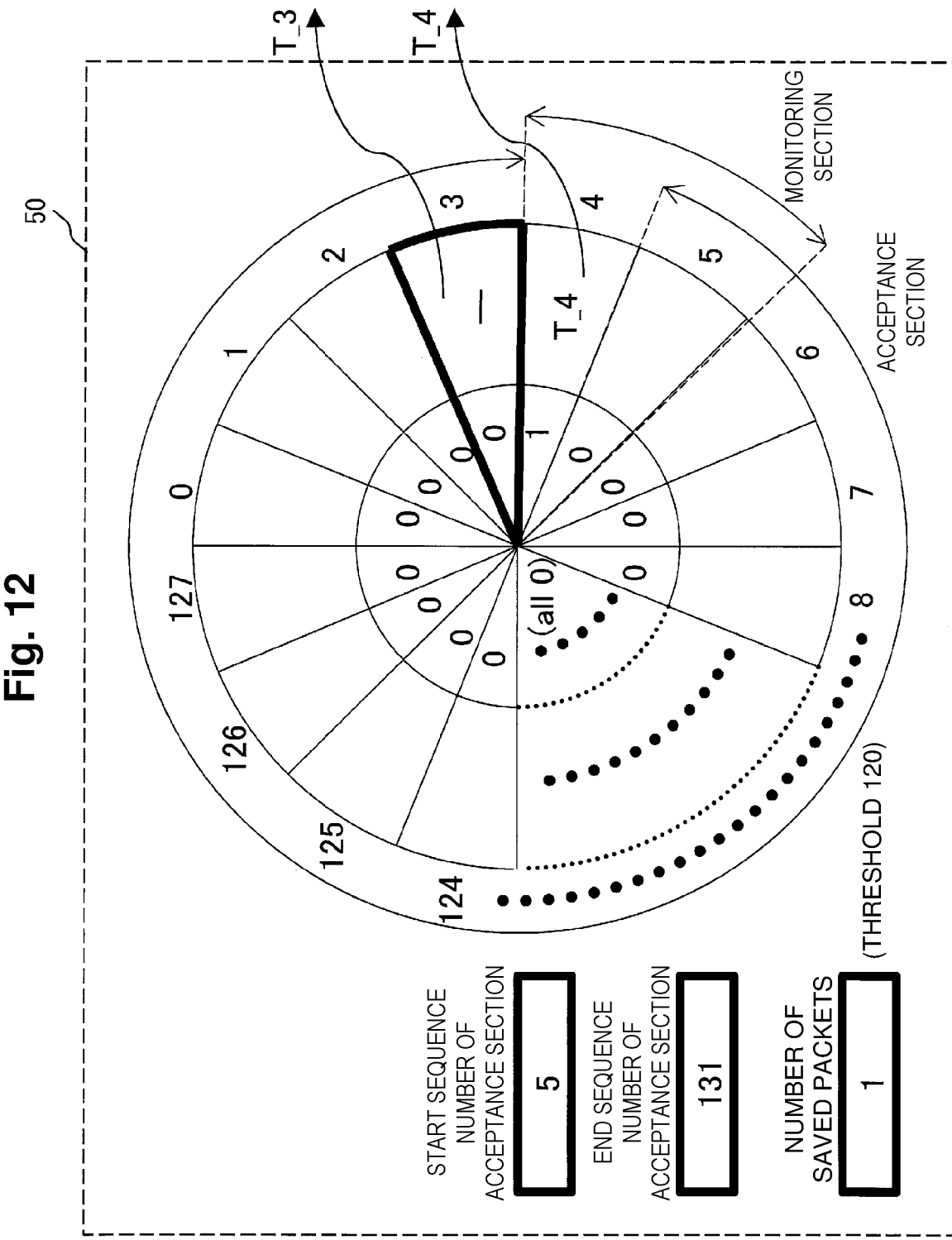
FIG. 12 is a diagram for explaining the operation of the ring buffer according to an embodiment.

FIG. 12 shows a state in which, since all data (the arrival time information T_3 and T_4) are collected in the monitoring section in the state shown in FIG. 11, all the data in the monitoring section are read out from the ring buffer. This is a state in which, as in FIG. 11, according to the execution of the readout processing from the monitoring section, the start sequence number and the end sequence number of each of the monitoring section and the acceptance section are updated to immediately following sequence numbers and the monitoring section and the acceptance section are respectively moved to immediately following sections. In this figure, in order to calculate an interval between the packet with the sequence number 4 and the packet with the next sequence number 5, the data T_4 of the sequence number 4 of the monitoring section is left even after the arrival time information T_3 and T_4 is read out.

In FIG. 12, the start sequence number and the end sequence number of the monitoring section are updated to (4, 5), which are numbers immediately following (3, 4) shown in FIG. 11, the start sequence number and the end sequence number of the acceptance section are updated to (5, 131), which are numbers immediately following (4, 130) shown in FIG. 11, and the monitoring section and the acceptance section are moved. The arrival flag of the storage region (the address=3) deviating from the monitoring section is lowered and the number of saved packets decreases by one to one. The arrival time information T_3 and T_4 read out from the ring buffer is transferred to the packet-interval calculation unit. The packet-interval calculation unit calculates a packet interval (T_4-T_3) of the serial number packets.

Operation at the Time when the Number of Saved Packets Reaches the Threshold

Figure 13:
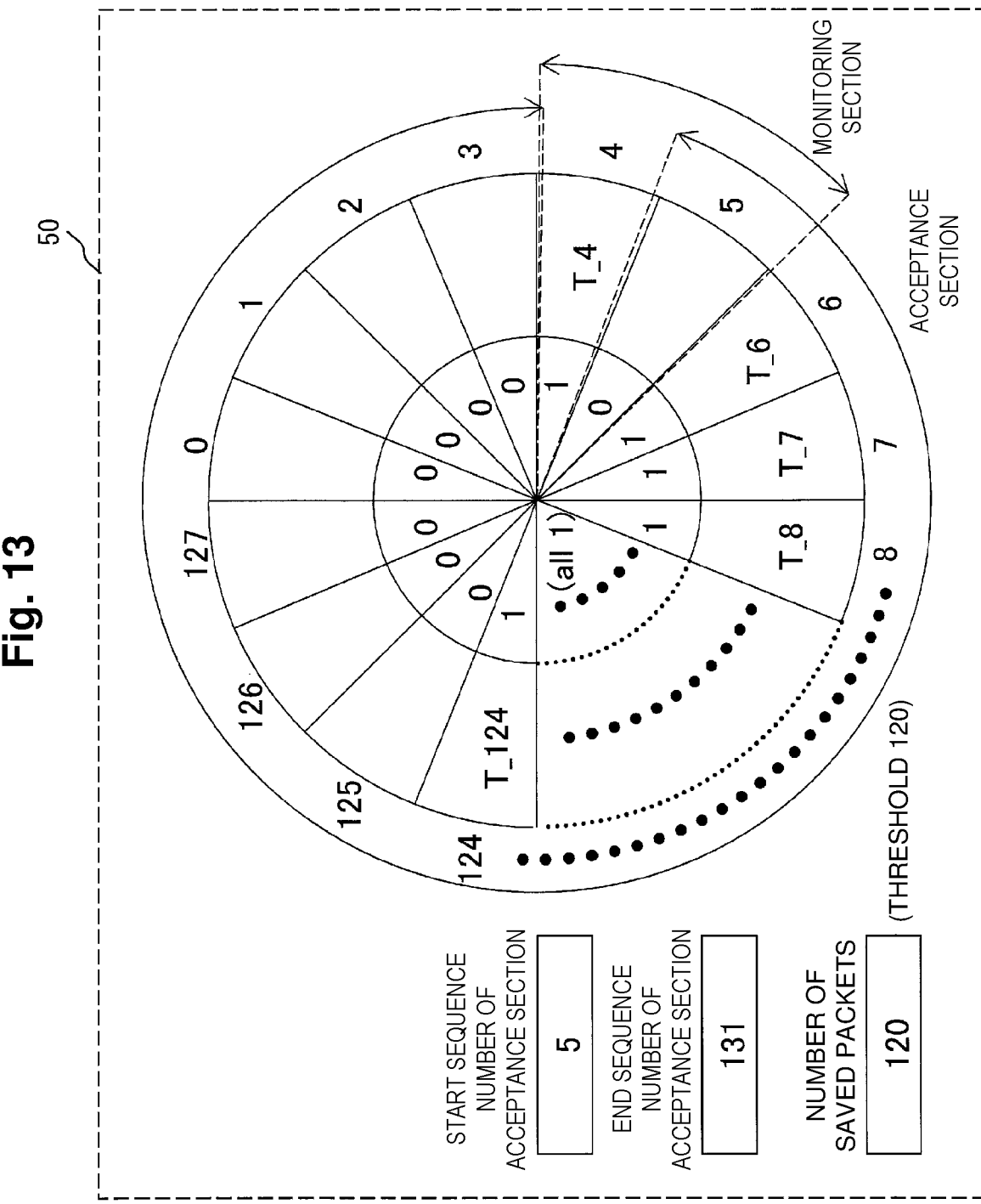
FIG. 13 is a diagram for explaining the operation of the ring buffer according to an embodiment.

FIG. 13 shows a state of the ring buffer after a packet with a sequence number=5 does not arrive, one hundred and nineteen packets with sequence numbers=6 to 124 arrive, and arrival time information T_6 to T_124 of the packets are written after the state shown in FIG. 12. Since data in the monitoring section is only T_4 and data is not written in the entire monitoring section, readout of data from the monitoring section is not performed, movement of the monitoring section and the acceptance section is not performed either, and start and end sequence numbers of the monitoring section and the acceptance section are the same as the start and end sequence numbers shown in FIG. 12. On the other hand, the number of saved packets increases by one hundred and nineteen to one hundred and twenty, reaching the threshold 120 of the number of saved packets.

Figure 14:
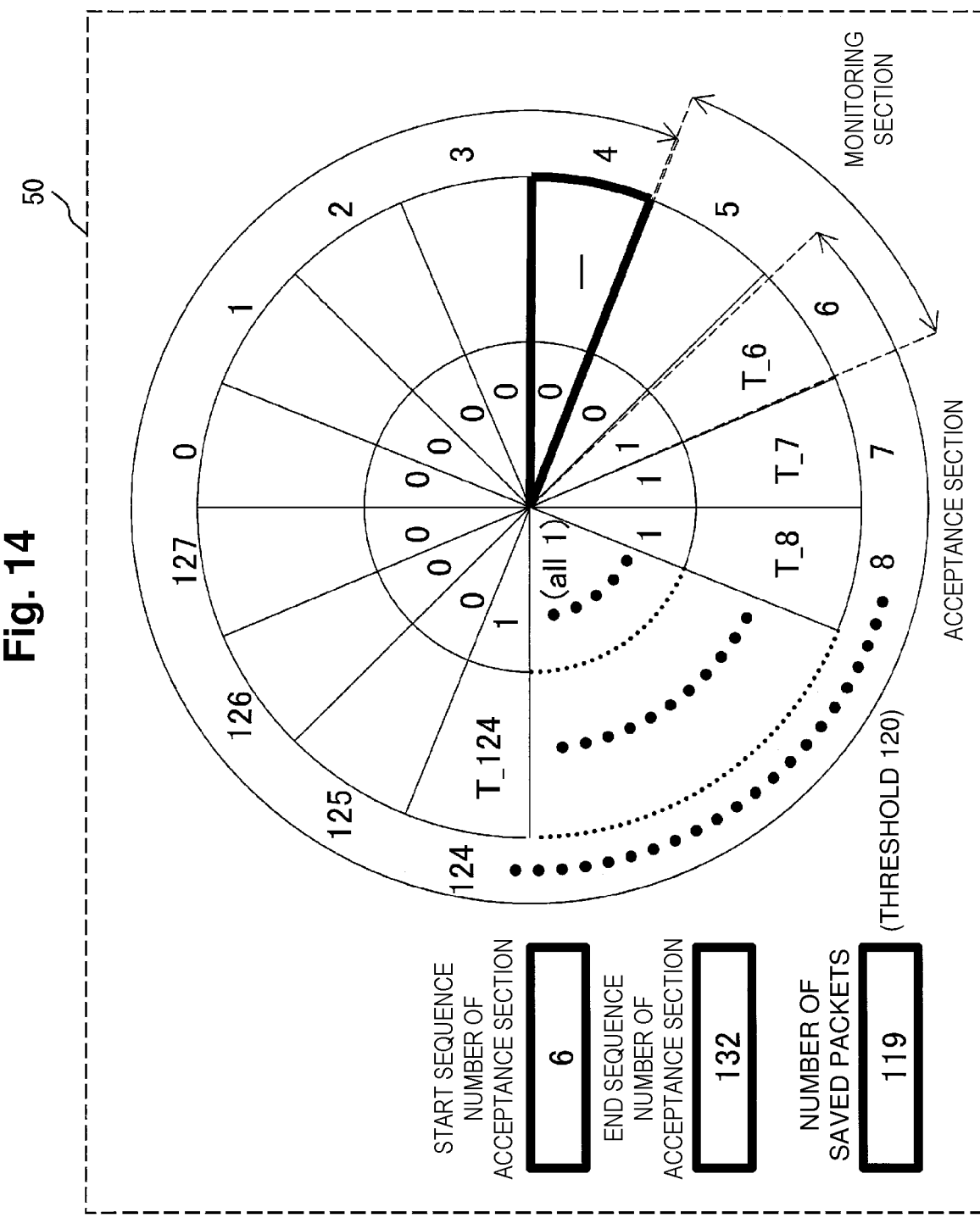
FIG. 14 is a diagram for explaining the operation of the ring buffer according to an embodiment.

FIG. 14 shows a state of the ring buffer in which, since the number of saved packets reaches the threshold 120 in FIG. 13, the monitoring section and the acceptance section are respectively moved to immediately following sections. This is a state in which the start sequence number and the end sequence number of the monitoring section are updated to (5, 6), which are numbers immediately following (4,5) shown in FIG. 13, the start sequence number and the end sequence number of the acceptance section are updated to (6, 132), which are numbers immediately following (5, 131) shown in FIG. 13, and the monitoring section and the acceptance section are moved. Since the arrival flag of the storage region (the address 4) deviating from the monitoring section is in a raised state in FIG. 13, the arrival flag of the address 4 is lowered and the number of saved packets is reduced by one to one hundred and nineteen.

Figure 15:
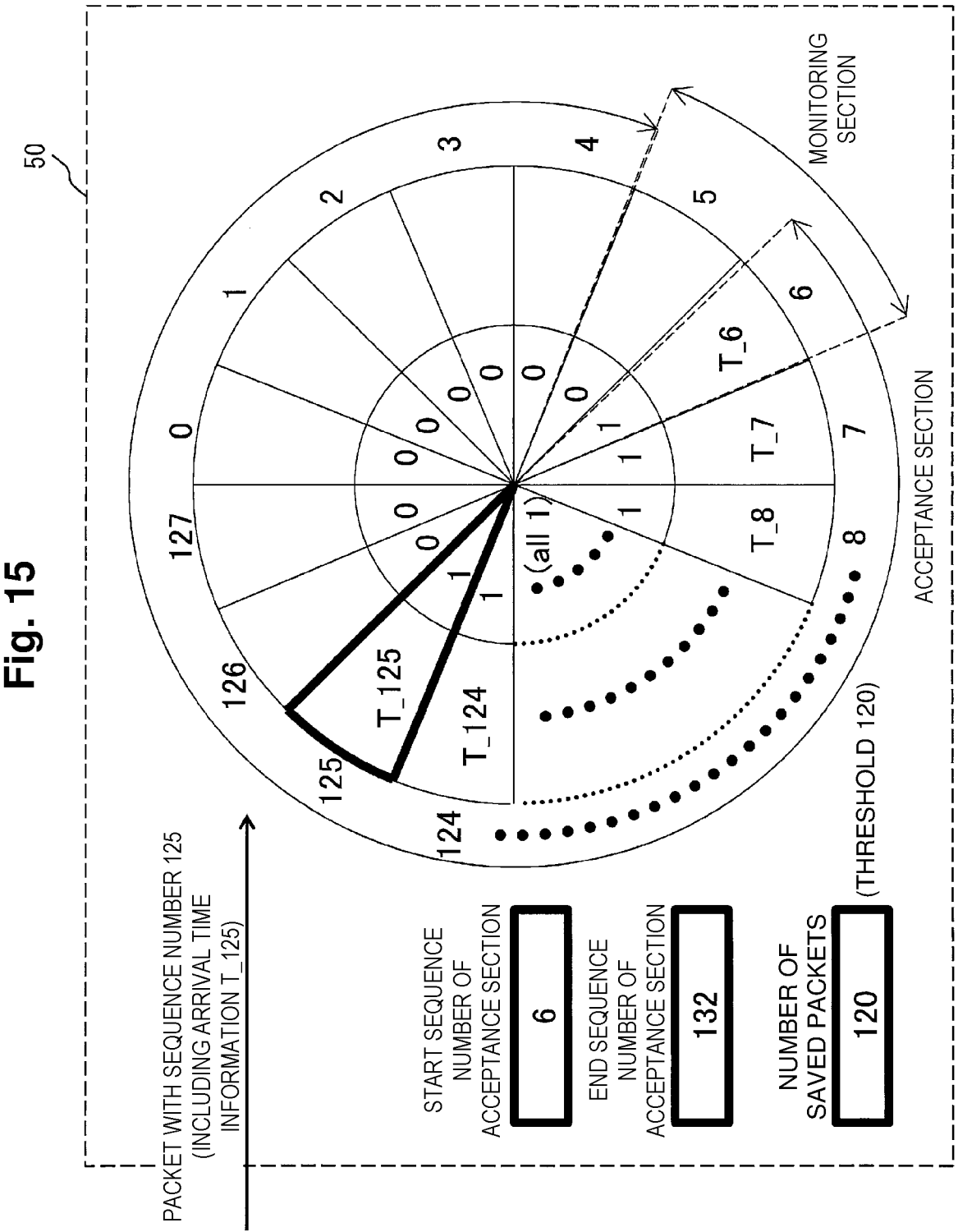
FIG. 15 is a diagram for explaining the operation of the ring buffer according to an embodiment.

FIG. 15 is a state of the ring buffer after a packet with a sequence number=125 arrives and arrival time information T_125 of the packet is written in FIG. 14. Since the sequence number 125 of the received packet is inside the acceptance section with respect to the start sequence number 6 to the end sequence number 132 of the acceptance section shown in FIG. 14, T_125 is stored in an address 125 (mod(125, 128)) corresponding to the sequence number 125, the arrival flag is set to 1, and the number of saved packets is increased by one to one hundred and twenty. In the state shown in FIG. 15, since data is not written in the entire monitoring section, readout processing from the monitoring section is not executed and the monitoring section and the acceptance section are not moved. However, as in FIG. 13, movement of the monitoring section and the acceptance section in the case in which the number of saved packets reaches the threshold 120 is performed.

Figure 16:
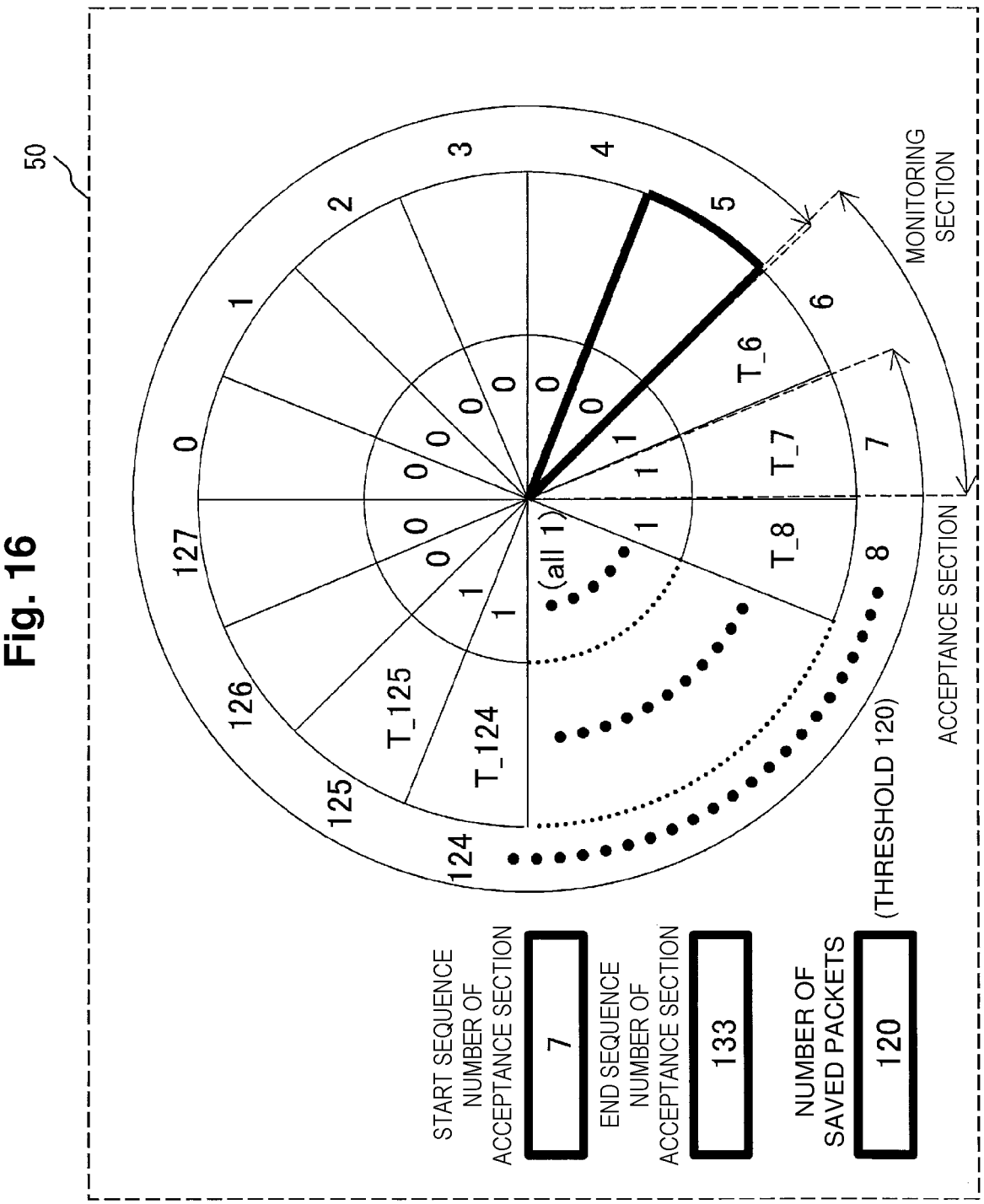
FIG. 16 is a diagram for explaining the operation of the ring buffer according to an embodiment.

FIG. 16 shows a state of the ring buffer in which, since the number of saved packets reaches the threshold 120 in FIG. 15, the monitoring section and the acceptance section are respectively moved to immediately following sections. This is a state in which the start sequence number and the end sequence number of the monitoring section are updated to (6, 7), which are numbers immediately following (5, 6) shown in FIG. 15, the start sequence number and the end sequence number of the acceptance section are updated to (7, 133), which are numbers immediately following (6, 132) shown in FIG. 15, and the monitoring section and the acceptance section are moved. An arrival flag of a storage region (an address 5) deviating from the monitoring section is lowered in the state shown in FIG. 15. Therefore, the arrival flag is held in the lowered state and the number of saved packets is not changed.

Figure 17:
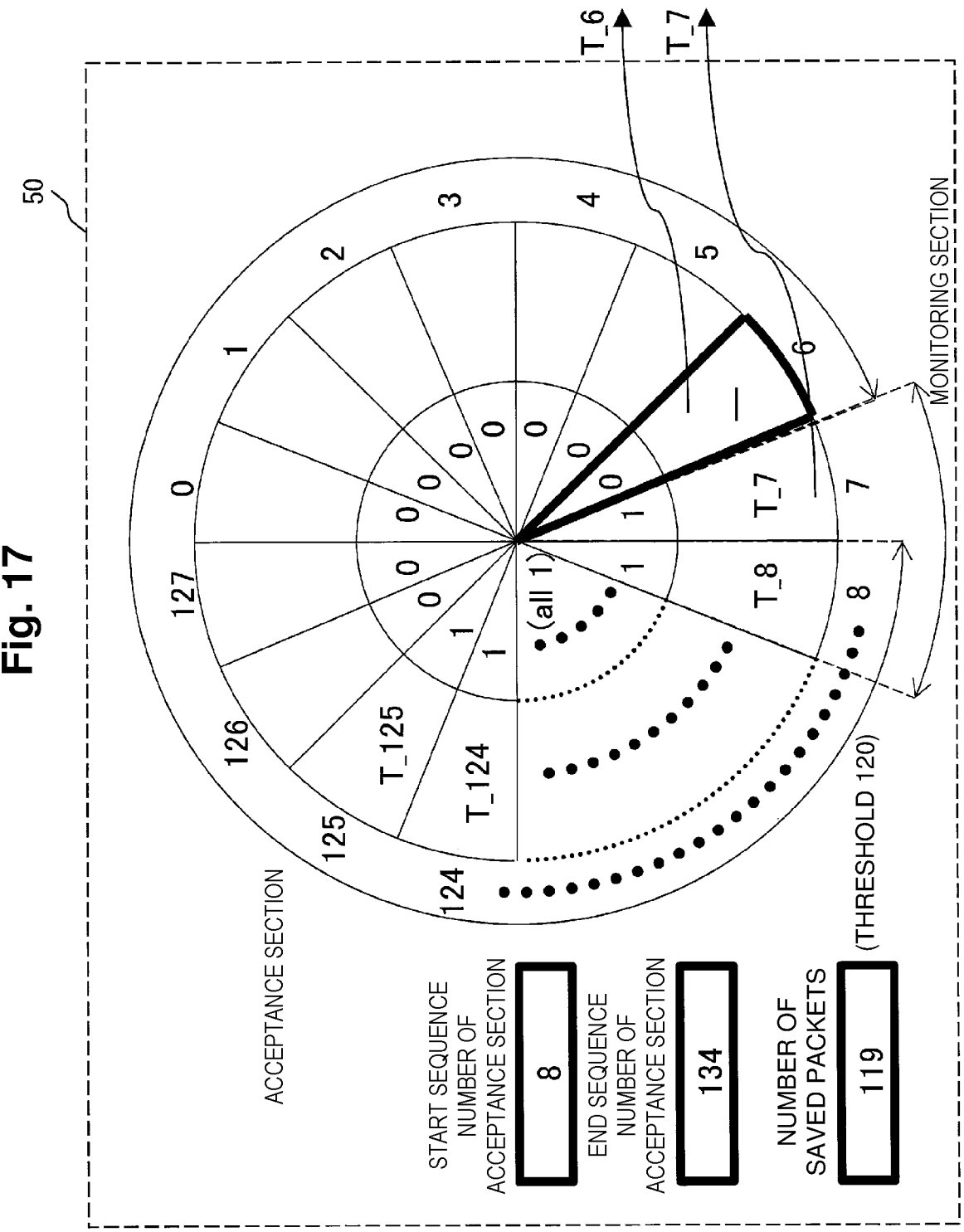
FIG. 17 is a diagram for explaining the operation of the ring buffer according to an embodiment.

FIG. 17 shows a state of the ring buffer in which, since all data (arrival time information T_6 and T_7) are collected in the monitoring section in the state shown in FIG. 16, all the data in the monitoring section are read out from the ring buffer and the monitoring section and the acceptance section are respectively moved to immediately following sections. This is a state in which, according to the execution of the readout processing from the monitoring section, the start sequence number and the end sequence number of each of the monitoring section and the acceptance section are updated to immediately following sequence numbers and the monitoring section and the acceptance section are respectively moved to immediately following sections. In this figure as well, in order to calculate an interval between the packet with the sequence number 7 and the packet with the next sequence number 8, the data T_7 of the sequence number 7 inside the monitoring section is left even after the arrival time information T_6 and T_7 is read out.

In FIG. 17, the start sequence number and the end sequence number of the monitoring section are updated to (7, 8), which are numbers immediately following (6, 7) shown in FIG. 16, the start sequence number and the end sequence number of the acceptance section are updated to (8, 134), which are numbers immediately following (7, 133) shown in FIG. 16, and the monitoring section and the acceptance section are moved. An arrival flag of a storage region (an address 6) deviating from the monitoring section is lowered and the number of saved packets is reduced by one to one hundred and nineteen. T_6 and T_7 read out from the ring buffer are transferred to the packet-interval calculation unit. The packet-interval calculation unit calculates a packet interval (T_7-T_6) of the serial number packets.

Thereafter, readout of data from the monitoring section and movement of the monitoring section and the acceptance section are repeatedly executed in the same manner.

Figure 18:
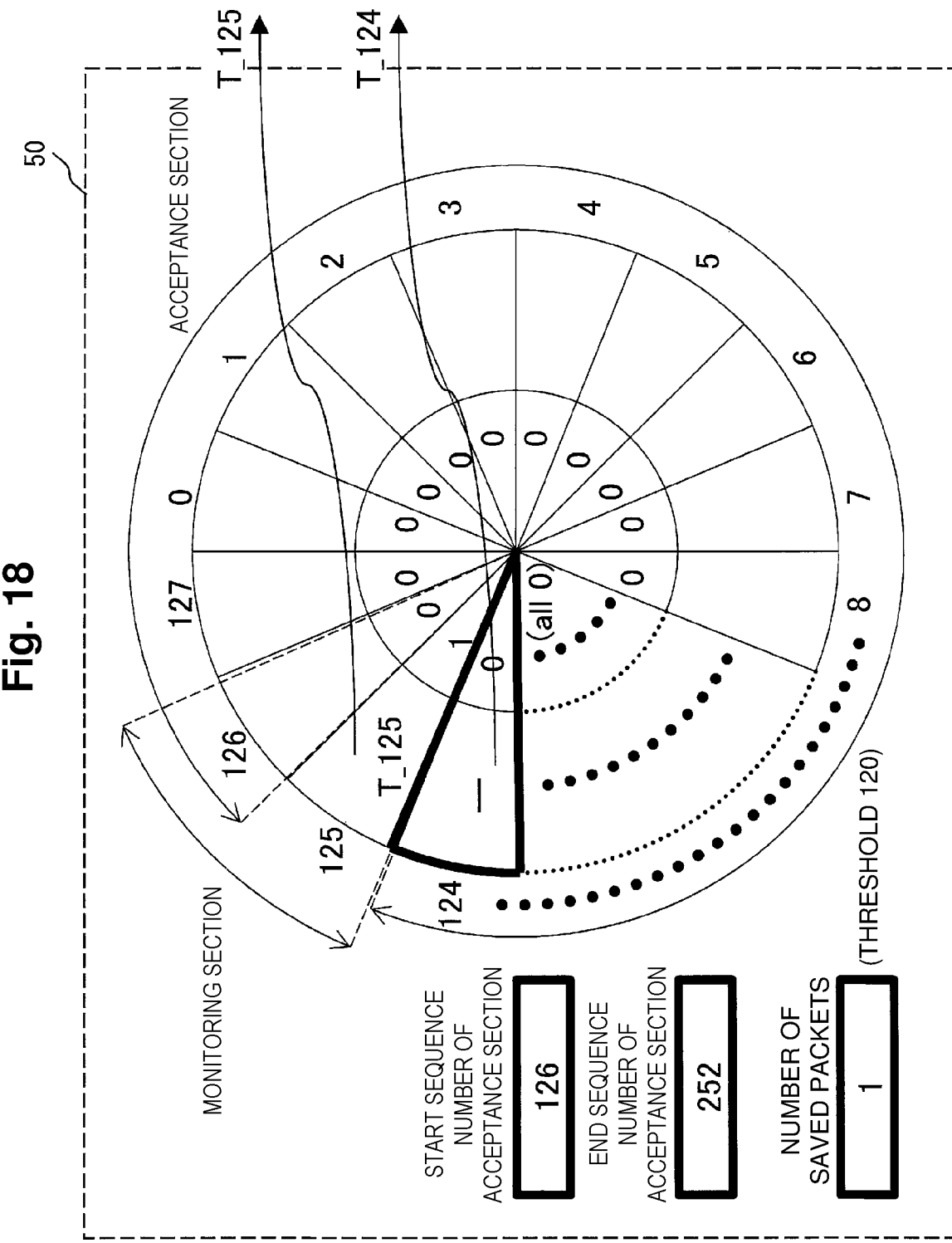
FIG. 18 is a diagram for explaining the operation of the ring buffer according to an embodiment.

FIG. 18 shows a state of the ring buffer after operation for reading out data (T_i, T_i+1) in the monitoring section from the ring buffer and respectively moving the monitoring section and the acceptance section to immediately following sections is repeated until data in the monitoring section are not collected after the state shown in FIG. 17 (i=7, 8, . . . , and 124). Lastly, T_124 and T_125 of addresses 124 and 125 are read out from the ring buffer and only T_125 of the address 125 is left. Only the arrival flag of the address 125 is 1 and the number of saved packets=1. The start sequence number and the end sequence number of the monitoring section are (125, 126). The start sequence number and the end sequence number of the acceptance section are (126, 252).

Operation at the Time when a Packet Outside the Acceptance Section is Received

Figure 19:
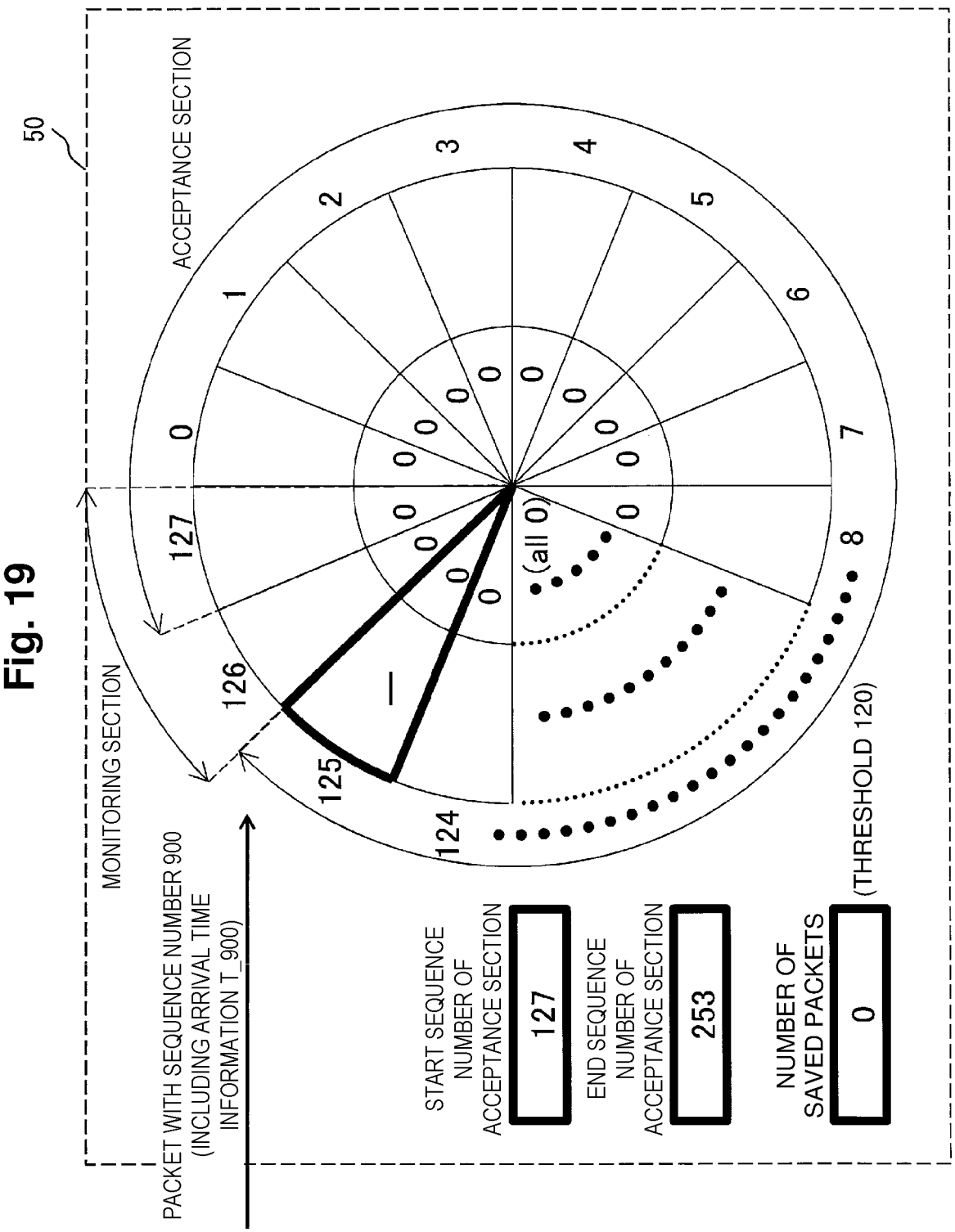
FIG. 19 is a diagram for explaining the operation of the ring buffer according to an embodiment.

FIG. 19 shows a state of the ring buffer in which, in the state shown in FIG. 18 in which the start sequence number and the end sequence number of the acceptance section are (126, 252), when a packet with a sequence number goo outside the acceptance section arrives, writing and readout are not performed and the monitoring section and the acceptance section are respectively moved to immediately following sections. This is a state in which the start sequence number and the end sequence number of the monitoring section are updated to (126, 127), which are numbers immediately following (125, 126), the start sequence number and the end sequence number of the acceptance section are updated to (127, 253), which are numbers immediately following (126, 252) shown in FIG. 18, and the monitoring section and the acceptance section are moved. An arrival flag of a storage region (an address 125) deviating from the monitoring section is lowered and the number of saved packets is reduced by one to zero. This state is the same as the initial state.

Figure 20:
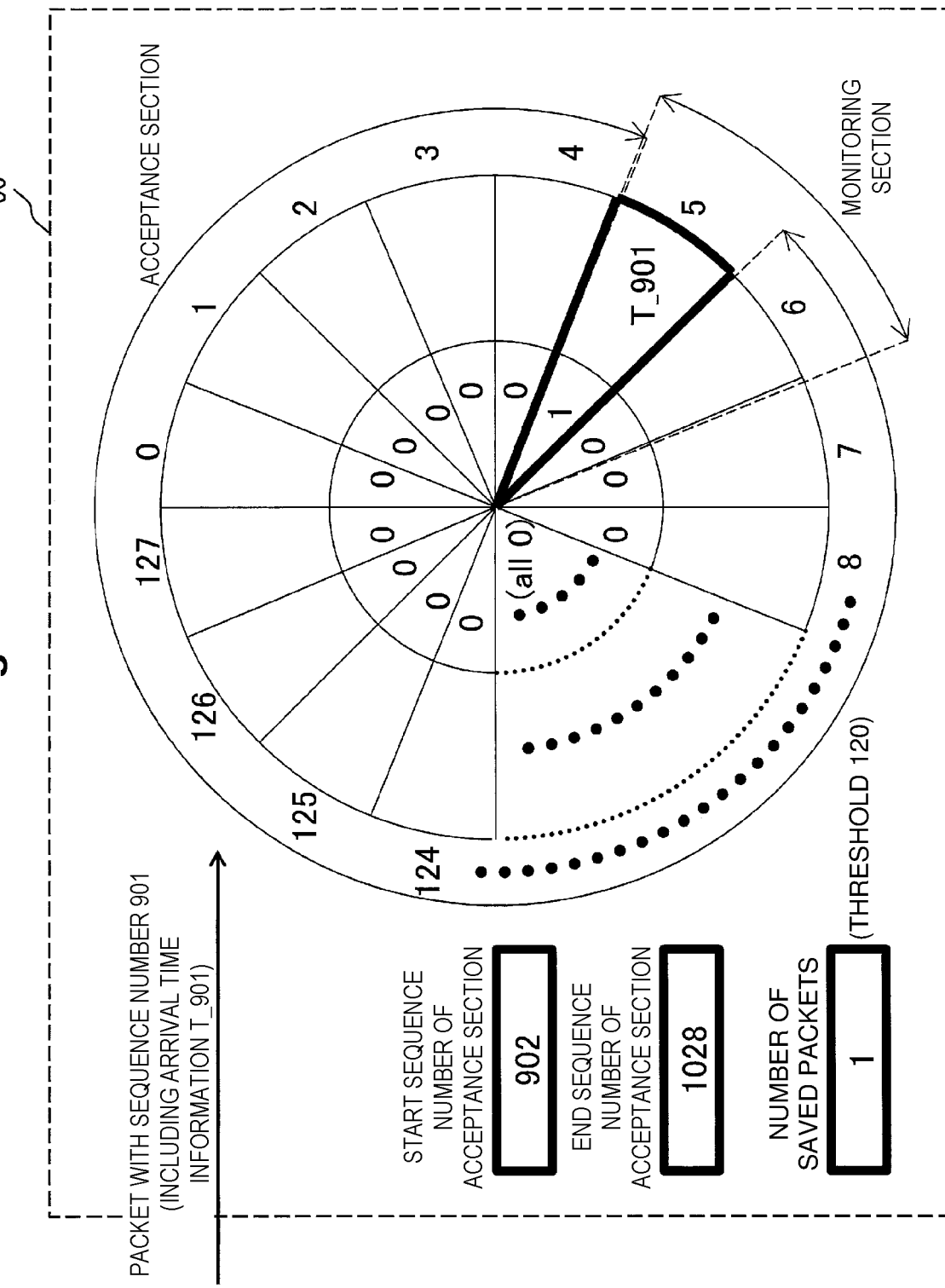
FIG. 20 is a diagram for explaining the operation of the ring buffer according to an embodiment.

FIG. 20 shows a state of the ring buffer after a packet with a sequence number 901 arrives and arrival time information T_901 of the packet is written in the state of the number of saved packets=0 shown in FIG. 19. The arrival time information T_901 is written in the address 5 (mod(901, 128)) corresponding to the sequence number 901 and the sequence number "901" becomes a start of the monitoring section. When T_901 is written in the address 5, the arrival flag of the address 5 of the storage region changes to 1, the start sequence number of the acceptance section changes to "902" immediately following the start sequence number "901" of the monitoring section, the end sequence number of the acceptance section changes to "1028", which is a 126 (128-2)-th sequence number following the start sequence number 902, and the number of saved packets changes to 1.

Operation at the Time when a Fixed Time Elapses from Arrival Time of Data at the Start or Closest to the Start When data to be written in the ring buffer includes arrival time information of a packet, in addition to the operation explained above, arrival time information of start data of the monitoring section may be compared with the present time. When the present time elapses more than a fixed time from the arrival time, the monitoring section and the acceptance section may be moved to immediately following sections.

When start data of the monitoring section is not written, arrival time information of second or subsequent data of the monitoring section closest to the start may be used. Even if data in the monitoring section is lost, by forcibly moving the monitoring section and the acceptance section, if data in the monitoring section are collected thereafter, it is possible to read out data from the ring buffer.

Effects of the First Embodiment

According to the first embodiment, when data are collected in the monitoring section having the width for two sequence numbers, all the data in the monitoring section are read out and the monitoring section and the acceptance section are moved to immediately following sections. Therefore, it is possible to perform, in real time, processing for extracting serial number packets out of packets arrived at random and calculating a packet interval. By determining a write destination storage region of data according to a remainder obtained by dividing a sequence number by the number of storage regions of the ring buffer, it is possible to perform sequence correction even when the number of storage regions of the ring buffer is limited and storage regions for all sequence numbers cannot be implemented.

In the first embodiment, unlike the related art, the starts and the ends of the monitoring section and the acceptance section are managed by sequence numbers rather than positions (addresses) of storage regions. Consequently, even when data, a remainder obtained by dividing a sequence number of which by the number of storage regions of the ring buffer is the same as a remainder of data already saved in the ring buffer but the sequence number of which is different from a sequence number of the data already stored in the ring buffer, arrives, it is possible to prevent a malfunction of arranging the data in the wrong order. Sequence control is possible within a range of width of sequence numbers in which the ring buffer can store data, that is, within a range from the start of the monitoring section to the end of the acceptance section.

Even when data in the monitoring section is lost, if the monitoring section and the acceptance section are forcibly moved according to one of two conditions explained below and data in the monitoring section are collected thereafter, it is possible to read out the data from the ring buffer. A first one of the conditions is that, when the number of data stored from the start of the monitoring section to the end of the acceptance section reaches a fixed number, the monitoring section and the acceptance section are moved to immediately following sections when received data is outside the acceptance section. A second one of the conditions is that, when a fixed time elapses from arrival time of data at the start or closest to the start, the monitoring section and the acceptance section are moved to sections immediately following the data at the start or closest to the start.

Further, by storing a frequency of moving the monitoring section and the acceptance section to following sections without reading out data in the monitoring section, it is also possible to grasp that a packet is discarded or lost.

Second Embodiment

In the first embodiment, two continuous sequence numbers are set as the monitoring section. However, when the data sequence correction method of embodiments of the present invention is used in a use for coupling payload portions of a packet in the order of sequence numbers and restoring original data, one sequence number may be set as the monitoring section. In this case, all that should be done is to set the start sequence number of the monitoring section as the start of the acceptance section, set a sequence number immediately preceding the start sequence number of the monitoring section as the end of the acceptance section, determine an address of a storage region at a writing destination as in the first embodiment, and write a payload and a part of header information or the entire packet in the ring buffer as data. In a second embodiment, if data of one packet is written in the monitoring section, all that should be done is to read out the data for one packet and move the monitoring section and the acceptance section to immediately following sections.

Processing performed when the number of data stored in the monitoring section start to the acceptance section end reaches a fixed number, when received data is outside the acceptance section, or when a fixed time elapses from arrival time of data at the start or closest to the start is the same as the processing in the first embodiment.

Effects of the Second Embodiment

In addition to the effects of the first embodiment, by setting one sequence number as the monitoring section, when the next packet of a packet read out from the ring buffer immediately before the next packet arrives, it is possible to immediately read out the next packet and apply the next packet to not only packet interval measurement but also data restoration.

Third Embodiment

In a third embodiment, as in the second embodiment, when the data sequence correction method of embodiments of the present invention is used in a use for coupling payload portions of a packet in the order of sequence numbers and restoring original data, when data transfer speed per one data bus for transferring data read out from the ring buffer to a restoration processing unit at a post-stage is low, a data bus width is increased to transfer data for a plurality of (N) packets to the restoration processing unit at the post-stage at a time.

In this case, all that should be done is to set N continuous sequence numbers as the monitoring section, set a start sequence number of the monitoring section as the start of the acceptance section, set a sequence number immediately preceding the start sequence number of the monitoring section as the end of the acceptance section, determine a writing destination address with the same method as the method in the first embodiment, and write a payload and a part of header information or the entire packet in the ring buffer as data. In the third embodiment, if data of N packets are collected in the monitoring section, all that should be done is to read out the data of the entire monitoring section (for the N packets) and move the monitoring section and the acceptance section for N sequence numbers of the monitoring section. The data for the N packets read out from the ring buffer are transferred to the restoration processing unit at the post-stage through each of N data buses.

Processing performed when the number of data stored in the monitoring section start to the acceptance section end reaches a fixed number, when received data is outside the acceptance section, or when a fixed time elapses from arrival time of data at the start or closest to the start is the same as the processing in the first embodiment.

Effects of the Third Embodiment

When continuous data for a plurality of packets are collected, the continuous data are collectively read out from the ring buffer and transferred to the restoration processing unit at the post-stage in parallel through a data bus having a large bus width. Consequently, even when data transfer speed per one data bus is low, it is possible to expand a bus width and improve total transfer speed of the entire data bus. It is possible to prevent packet output speed from decreasing with respect to packet input speed.

Expansion of the Embodiments

The present invention is explained above with reference to the embodiments. However, the present invention is not limited to the embodiments explained above. Various changes that those skilled in the art can understand within the scope of the technical idea of the present invention can be made on the configuration and the details of embodiments of the present invention.

REFERENCE SIGNS LIST

1 Packet monitoring device
10 PHY unit
20 MAC unit
30 Arrival-time-information provision unit
40 Monitoring-target extraction unit
50 Packet-sequence correction unit
51 Acceptability determination unit
52 Ring-buffer write unit
53 Ring-buffer readout unit
54 Monitoring section/acceptance section management unit
55 Ring buffer
60 Packet-interval calculation unit
70 Statistical-information storage unit
80 Visualization unit
90 Network tap

The invention claimed is:

1. A data sequence correction method for temporarily saving data with sequence information in a ring buffer and performing sequence correction, the ring buffer comprising a predetermined number of storage regions corresponding to the sequence information, a monitoring section having a plurality of continuous sequence numbers including a start sequence number and an end sequence number, and an acceptance section having a selected sequence number of the monitoring section as a start sequence number and having a sequence number immediately preceding the start sequence number of the monitoring section as an end sequence number, the data sequence correction method comprising:
  in response to a value determined based on a remainder obtained by dividing a sequence number of received data by the number of storage regions of the ring buffer being inside the acceptance section, writing the received data in a position of the storage region corresponding to the determined value;
  in response to the received data being written in an entirety of the monitoring section, reading out all the received data in the monitoring section; and
  following reading out all the received data in the monitoring section, updating the start sequence number and the end sequence number of each of the monitoring section and the acceptance section to immediately following sequence numbers, respectively.

2. The data sequence correction method according to claim 1, wherein:
  in response to a number of data stored in the ring buffer being zero, the received data is written in the position of the storage region corresponding to the value determined based on the remainder obtained by dividing the sequence number of the received data by the number of storage regions of the ring buffer; and the storage region in which the received data is written is set as a start of the monitoring section and the start sequence number and the end sequence number of each of the monitoring section and the acceptance section are determined according to the start of the monitoring section.

3. The data sequence correction method according to claim 1, wherein, in response to a number of data stored from a start of the monitoring section to an end of the acceptance section reaching a predetermined number, the start sequence number and the end sequence number of each of the monitoring section and the acceptance section are updated to the immediately following sequence numbers, respectively.

4. The data sequence correction method according to claim 1, wherein, in response to the value determined based on the remainder obtained by dividing the sequence information of the received data by the number of storage regions of the ring buffer not being inside the acceptance section, the start sequence number and the end sequence number of each of the monitoring section and the acceptance section are updated to the immediately following sequence numbers, respectively.

5. The data sequence correction method according to claim 1, wherein:

in response to the received data being written in the ring buffer, information concerning an arrival time of the received data is written; and in response to a predetermined time elapsing from the arrival time of the received data at a start of the monitoring section or closest to the start, the start sequence number and the end sequence number of each of the monitoring section and the acceptance section are updated to the immediately following sequence numbers, respectively.

6. The data sequence correction method according to claim 5, wherein a frequency of moving the monitoring section and the acceptance section to following sections based on at least one reason is stored for each reason.

7. The data sequence correction method according to claim 6, wherein the reason comprises a number of data stored from the start of the monitoring section to an end of the acceptance section reaching a fixed number.

8. The data sequence correction method according to claim 6, wherein the reason comprises the received data being discarded outside the acceptance section.

9. The data sequence correction method according to claim 6, wherein the reason comprises a fixed time elapsing from the arrival time of the received data at the start of the monitoring section or closest to the start.

10. The data sequence correction method according to claim 5, wherein a frequency of moving the monitoring section and the acceptance section to following sections based on a plurality of reasons is stored collectively for the plurality of reasons, the plurality of reasons comprising:

a number of data stored from the start of the monitoring section to an end of the acceptance section reaching a fixed number;

the received data being discarded outside the acceptance section; and a fixed time elapsing from the arrival time of the received data at the start of the monitoring section or closest to the start.

11. A packet monitoring device comprising:

an arrival-time-information provider configured to provide arrival time information to a received packet having a header including sequence information;

a monitoring-target extractor configured to extract a monitoring target packet based on information in the header of the received packet;

a packet-sequence corrector configured to correct a sequence of the monitoring target packet, based on the sequence information in a header of the monitoring target packet, with the method according to claim 10 and output arrival time information of two packets, the sequence information of which is continuous;

a packet-interval calculator configured to calculate a packet interval from a difference between the arrival times of the two packets; and a display configured to display, as a histogram, a frequency distribution of the packet interval stored in a statistical-information storage.

12. A data sequence correction device that temporarily saves data with sequence information in a ring buffer and performs sequence correction, the ring buffer comprising a predetermined number of storage regions corresponding to the sequence information, a monitoring section having a plurality of continuous sequence numbers including a start sequence number and an end sequence number, and an acceptance section having a selected sequence number of the monitoring section as a start sequence number and having a sequence number immediately preceding the start sequence number of the monitoring section as an end sequence number, the data sequence correction device comprising:

an acceptability determiner configured to determine whether a value determined based on a remainder obtained by dividing a sequence number of received data by the number of storage regions of the ring buffer is inside the acceptance section;

a ring-buffer writer configured to, in response to the value determined based on the remainder obtained by dividing the sequence number of the received data by the number of storage regions of the ring buffer being inside the acceptance section, write the received data in a position of the storage region corresponding to the determined value;

a ring-buffer reader configured to, in response to the received data being written in an entirety of the monitoring section, read out all the received data in the monitoring section; and a monitoring section/acceptance section manager configured to, in response to all the received data in the monitoring section being read out, update the start sequence number and the end sequence number of each of the monitoring section and the acceptance section to immediately following sequence numbers, respectively.

13. A data sequence correction program stored in a non-transitory storage media for executing a data sequence correction method for temporarily saving data with sequence information in a ring buffer and performing sequence correction, the ring buffer comprising a predetermined number of storage regions corresponding to the sequence information, a monitoring section having a plurality of continuous sequence numbers including a start sequence number and an end sequence number, and an acceptance section having a selected sequence number of the monitoring section as a start sequence number and having a sequence number immediately preceding the start sequence number of the monitoring section as an end sequence number, the data sequence correction program configured to cause a computer to execute:

a step of, in response to a value determined based on a remainder obtained by dividing a sequence number of received data by the number of storage regions of the ring buffer being inside the acceptance section, writing the received data in a position of the storage region corresponding to the determined value;

a step of, in response to the received data being written in an entirety of the monitoring section, reading out all the received data in the monitoring section; and a step of, in response to reading out all the received data in the monitoring section, updating the start sequence number and the end sequence number of each of the monitoring section and the acceptance section to immediately following sequence numbers, respectively.

* * * * *